United States Patent
Plante et al.

(10) Patent No.: US 10,480,594 B2
(45) Date of Patent: Nov. 19, 2019

(54) MAGNETORHEOLOGICAL FLUID CLUTCH APPARATUS WITH CYLINDRICAL FLUID GAP

(71) Applicant: EXONETIK INC., Sherbrooke (CA)

(72) Inventors: Jean-Sebastien Plante, Sherbrooke (CA); Marc Denninger, Sherbrooke (CA); Guifre Julio, Sherbrooke (CA); Patrick Chouinard, Sherbrooke (CA); Pascal Larose, Sherbrooke (CA)

(73) Assignee: EXONETIK INC., Sherbrooke (CA)

( * ) Notice: Subject to any disclaimer, the term of this patent is extended or adjusted under 35 U.S.C. 154(b) by 203 days.

(21) Appl. No.: 15/785,916

(22) PCT Filed: Apr. 21, 2016

(86) PCT No.: PCT/CA2016/050464
§ 371 (c)(1),
(2) Date: Oct. 17, 2017

(87) PCT Pub. No.: WO2016/168934
PCT Pub. Date: Oct. 27, 2016

(65) Prior Publication Data
US 2018/0156285 A1 Jun. 7, 2018

Related U.S. Application Data

(60) Provisional application No. 62/173,606, filed on Jun. 10, 2015, provisional application No. 62/150,611, filed on Apr. 21, 2015.

(51) Int. Cl.
*F16D 37/02* (2006.01)
*F16D 29/00* (2006.01)
(Continued)

(52) U.S. Cl.
CPC .............. *F16D 37/02* (2013.01); *F16D 29/00* (2013.01); *F16D 37/008* (2013.01); *B64C 27/59* (2013.01);
(Continued)

(58) Field of Classification Search
None
See application file for complete search history.

(56) References Cited

U.S. PATENT DOCUMENTS 3,335,829 A * 8/1967 De Coye De Castelet .................
F16D 27/02
192/103 R
3,450,238 A 6/1969 Adkins
(Continued)

FOREIGN PATENT DOCUMENTS

CN 1757950 A 4/2006
CN 102562857 A 7/2012
(Continued)

*Primary Examiner* — Colby M Hansen
(74) *Attorney, Agent, or Firm* — Norton Rose Fulbright Canada LLP

(57) ABSTRACT

A magnetorheological fluid clutch apparatus comprises a stator having at least an annular wall; a first rotor rotatably mounted to the stator, the first rotor having at least one first shear surface; a second rotor rotatably mounted to the stator for rotating about a common axis with the first rotor, the second rotor having at least one second shear surface opposite the at least one first shear surface, the shear surfaces separated by at least one annular space. A magnetorheological (MR) fluid is in an MR fluid chamber including the at least one annular space, the MR fluid configured to generate a variable amount of torque transmission between the rotors when subjected to a magnetic field. An inner magnetic core and an outer magnetic core with an annular cavity therebetween receive the annular wall of the stator, the inner magnetic core and the outer magnetic core (Continued)

connected to at least one of the rotors to rotate therewith so as to be rotatably mounted to the stator. Outer and inner fluid gaps are between the inner magnetic core and the annular wall, and between the outer magnetic core and the annular wall, the outer and inner fluid gaps filled with at least one fluid. At least one coil is supported by the annular wall and actuatable to deliver a magnetic field through the MR fluid, the magnetic field following a path comprising the annular wall, the outer fluid gap, the outer magnetic core, the at least one first shear surface and the at least one second shear surface, the inner magnetic core and the inner fluid gap, wherein one of the rotors is adapted to be coupled to a power input and the other of the rotors is adapted to be connected to an output whereby actuation of the at least one coil results in a variation of torque transmission between the rotors.

19 Claims, 15 Drawing Sheets

(51) Int. Cl.
*B64C 27/59* (2006.01)
*F16D 37/00* (2006.01)

(52) U.S. Cl.
CPC .. *F16D 2037/001* (2013.01); *F16D 2037/004* (2013.01); *F16D 2037/007* (2013.01)

(56) References Cited

U.S. PATENT DOCUMENTS

| | | | | |
|---|---|---|---|---|
| 4,765,140 A | * | 8/1988 | Imoto | B60T 8/3205 |
| | | | | 188/72.1 |
| 5,779,013 A | | 7/1998 | Bansbach | |
| 5,845,753 A | * | 12/1998 | Bansbach | F16D 37/02 |
| | | | | 192/21.5 |
| 5,967,273 A | * | 10/1999 | Hampton | F16D 37/008 |
| | | | | 192/21.5 |
| 6,032,772 A | * | 3/2000 | Moser | F16D 37/02 |
| | | | | 192/21.5 |
| 6,173,823 B1 | * | 1/2001 | Moser | F16D 37/02 |
| | | | | 192/21.5 |
| 2005/0188690 A1 | | 9/2005 | Namaduri et al. | |
| 2006/0272916 A1 | | 12/2006 | Robb et al. | |
| 2007/0060436 A1 | * | 3/2007 | Boddy | B60W 30/02 |
| | | | | 475/84 |
| 2015/0217866 A1 | | 8/2015 | Spina et al. | |

FOREIGN PATENT DOCUMENTS

| | | |
|---|---|---|
| CN | 202484131 U | 10/2012 |
| CN | 203463530 U | 3/2014 |
| CN | 105221602 A | 1/2016 |
| EP | 0856676 A1 | 8/1998 |
| EP | 0899475 A2 | 3/1999 |
| EP | 1 225 361 A1 | 7/2002 |
| EP | 2275701 A2 | 1/2011 |
| JP | 2002181079 A | 6/2002 |
| JP | 2013204674 A | 10/2013 |
| WO | 2004070224 A1 | 8/2004 |
| WO | 2008/131937 A1 | 11/2008 |

\* cited by examiner

MAGNETORHEOLOGICAL FLUID CLUTCH APPARATUS WITH CYLINDRICAL FLUID GAP

CROSS-REFERENCE TO RELATED APPLICATION

The present application claims priority on U.S. Provisional Patent Application No. 62/150,611 filed on Apr. 21, 2015, and on U.S. Provisional Patent Application No. 62/173,606 filed on Jun. 10, 2015, the contents of both being incorporated herein by reference.

TECHNICAL FIELD

The present application relates generally to magnetorheological (MR) fluid clutch apparatuses.

BACKGROUND OF THE ART

Controlled slippage actuation systems use a power source whose power is distributed to one or multiple mechanical outputs through MR fluid clutch apparatuses. These actuation systems are alternatives to commonly used electric actuation systems, when high load and high dynamic performance are sought. They show similar dynamic performance and may represent an overall weight reduction.

Other state-of-the-art distributed power devices rely on hydraulics or electromagnetic actuation. Hydraulic actuation is highly reliable in avoiding mechanical jams, but has a fundamentally limited dynamic response and efficiency. Furthermore, implementation of hydraulic systems into commercial applications is often problematic as hydraulics are prone to leakage and lead to increase maintenance costs. Electromagnetic actuation offers an alternative to hydraulic actuation. For example, actuation systems using direct-drive electric motors show similar dynamic performance but may be heavier in comparison to controlled slippage actuation systems, whereas actuation systems using geared electric motors may have lower dynamic performance than controlled slippage actuation systems, due to the gearing. Indeed, when coupled to reduction gearboxes, electromechanical actuators are much lighter and less expensive than direct drive solutions, but their high output inertia, friction and backlash greatly diminish their dynamic performance.

SUMMARY

It is an aim of the present disclosure to provide a novel MR fluid clutch apparatus.

Therefore, in accordance with a first embodiment of the present disclosure, there is provided a magnetorheological fluid clutch apparatus comprising: a stator adapted to be connected to a structure, the stator having at least an annular wall; a first rotor rotatably mounted to the stator, the first rotor having at least one first shear surface; a second rotor rotatably mounted to the stator for rotating about a common axis with the first rotor, the second rotor having at least one second shear surface opposite the at least one first shear surface, the shear surfaces separated by at least one annular space; magnetorheological (MR) fluid in an MR fluid chamber including the at least one annular space, the MR fluid configured to generate a variable amount of torque transmission between the rotors when subjected to a magnetic field; an inner magnetic core and an outer magnetic core with an annular cavity therebetween receiving the annular wall of the stator, the inner magnetic core and the outer magnetic core connected to at least one of the rotors to rotate therewith so as to be rotatably mounted to the stator; outer and inner fluid gaps between the inner magnetic core and the annular wall, and between the outer magnetic core and the annular wall, the outer and inner fluid gaps filled with at least one fluid; and at least one coil supported by the annular wall and actuatable to deliver a magnetic field through the MR fluid, the magnetic field following a path comprising the annular wall, the outer fluid gap, the outer magnetic core, the at least one first shear surface and the at least one second shear surface, the inner magnetic core and the inner fluid gap; wherein one of the rotors is adapted to be coupled to a power input and the other of the rotors is adapted to be connected to an output whereby actuation of the at least one coil results in a variation of torque transmission between the rotors.

Further in accordance with the first embodiment, the at least one first shear surface comprises at least one first drum, and further wherein the at least one second shear surface comprises at least one second drum.

Still further in accordance with the first embodiment, a plurality of the first drum, a plurality of the second drum, the first drums being intertwined with the second drums.

Still further in accordance with the first embodiment, the first drums are supported on one side of a first drum holder, the MR fluid chamber including a hollow chamber being on an opposite side of the first drum holder, and at least one first fluid passage being defined through the first drum holder.

Still further in accordance with the first embodiment, the second drums are supported by a second drum holder, the MR fluid chamber further including at least one second fluid passage being defined through the second drum holder.

Still further in accordance with the first embodiment, a magnetorheological fluid path is sequentially defined in the MR fluid chamber by the annular spaces, the first fluid passages, the hollow chamber, fluid passages in the outer magnetic core, a space outward of the drums, and the second fluid passages.

Still further in accordance with the first embodiment, the space outward of the drums is an inner cavity of a cover of the first rotor.

Still further in accordance with the first embodiment, heat exchange fins are on an outer surface of the cover.

Still further in accordance with the first embodiment, an opening is in the cover open to the MR fluid chamber, the opening being sealed closed by a flexible membrane.

Still further in accordance with the first embodiment, the opening opens to an expansion chamber, a resilient material being in the expansion chamber to selectively exert a biasing force on the flexible membrane.

Still further in accordance with the first embodiment, the inner magnetic core and an outer magnetic core are connected to the first rotor.

Still further in accordance with the first embodiment, at least one permanent magnet is supported by the annular wall and delivering a magnetic field through the MR fluid when no other magnetic field are present, wherein the at least one coil is actuatable to deliver a magnetic field redirecting the magnetic field of the at least one permanent magnet away from the MR fluid in order to decrease an apparent magnetic field in the MR fluid.

Still further in accordance with the first embodiment, one of the rotors is connected to an energy recovery device to recover energy with an output of one of the rotors.

Still further in accordance with the first embodiment, a first seal is connected to the stator, and in sealing engagement on an output shaft of the second rotor to bound the MR fluid chamber between the stator and the output shaft, a second seal being connected to the stator and in sealing engagement on the output shaft, such that a non-MR oil chamber is defined between the first seal, the second seal, the stator and the shaft, at least one bearing between the output shaft and the stator being located outside of the non-MR oil chamber and of the MR fluid chamber.

Still further in accordance with the first embodiment, at least one permanent magnet emits a magnetic field in the non-MR oil chamber to attract MR fluid leaking into the non-MR oil chamber.

Still further in accordance with the first embodiment, one translational joint supports the second rotor such that the second rotor is axially movable away from the first rotor to separate the shear surfaces from one another.

Still further in accordance with the first embodiment, the fluid gaps are radial fluid gaps.

Further in accordance with a second embodiment of the present disclosure, there is provided a magnetorheological fluid clutch apparatus comprising: a stator adapted to be connected to a structure, the stator having at least an annular wall; a first rotor rotatably mounted to the stator, the first rotor having at least one first drum supported on one side of a first drum holder, a hollow chamber on an opposite side of the first drum holder, and at least one first fluid passage through the first drum holder; a second rotor rotatably mounted to the stator for rotating about a common axis with the first rotor, the second rotor having at least one second drum opposite the at least one first drum and separated by annular spaces, the at least one second drum supported by a second drum holder, at least one second fluid passage being defined through the second drum holder; magnetorheological (MR) fluid in an MR fluid chamber including the annular spaces between the drums, the MR fluid configured to generate a variable amount of torque transmission between the rotors when subjected to a magnetic field; and an inner magnetic core and an outer magnetic core, the inner magnetic core and the outer magnetic core connected to at least one of the rotor to rotate therewith so as to be rotatably mounted to the stator; and at least one coil supported by the annular wall and actuatable to deliver a magnetic field through the MR fluid, the magnetic field following a path comprising at least the annular wall, the outer magnetic core, the at least one first drum and the at least one second drum, and the inner magnetic core; wherein a magnetorheological fluid path is sequentially defined by the annular spaces, the first fluid passages, the hollow chamber, fluid passages in the outer magnetic core, a space outward of the drums, and the second fluid passages; wherein one of the rotors is adapted to be coupled to a power input and the other of the rotors is adapted to be connected to an output whereby actuation of the at least one coil results in a variation of torque transmission between the rotors.

Further in accordance with the second embodiment, a plurality of the first drum, a plurality of the second drum, the first drums being intertwined with the second drums with the annular spaces therebetween.

Still further in accordance with the second embodiment, the space outward of the drums is an inner cavity of a cover of the first rotor.

Still further in accordance with the second embodiment, heat exchange fins are on an outer surface of the cover.

Still further in accordance with the second embodiment, an opening in the cover is open to the MR fluid chamber, the opening being sealed closed by a flexible membrane.

Still further in accordance with the second embodiment, the opening opens to an expansion chamber, a resilient material being in the expansion chamber to selectively exert a biasing force on the flexible membrane.

Still further in accordance with the second embodiment, at least one permanent magnet is supported by the annular wall and delivering a magnetic field through the MR fluid when no other magnetic field are present, wherein the at least one coil is actuatable to deliver a magnetic field redirecting the magnetic field of the at least one permanent magnet away from the MR fluid in order to decrease an apparent magnetic field in the MR fluid.

Still further in accordance with the second embodiment, one of the rotors is connected to an energy recovery device to recover energy with an output of one of the rotors.

Still further in accordance with the second embodiment, a first seal is connected to the stator, and in sealing engagement on an output shaft of the second rotor to bound the MR fluid chamber between the stator and the output shaft, a second seal being connected to the stator and in sealing engagement on the output shaft, such that a non-MR oil chamber is defined between the first seal, the second seal, the stator and the shaft, at least one bearing between the output shaft and the stator being located outside of the non-MR oil chamber and of the MR fluid chamber.

Still further in accordance with the second embodiment, at least one permanent magnet emits a magnetic field in the non-MR oil chamber to attract MR fluid leaking into the non-MR oil chamber.

Still further in accordance with the second embodiment, one translational joint supports the second rotor such that the second rotor is axially movable away from the first rotor to separate the first drums from the second drums.

In accordance with a third embodiment of the present disclosure, there is provided a magnetorheological fluid clutch apparatus comprising: a stator adapted to be connected to a structure and having a power emitting device; a first rotor rotatably mounted to the stator, the first rotor having a magnetic core, at least one first shear surface, and a power receiving device configured to wirelessly receive power from the power emitting device on the stator; at least one fluid gap between the power emitting device and the power receiving device, the fluid gap entirely filled with a fluid; a second rotor rotatably mounted to the stator for rotating about a common axis with the first rotor, the second rotor having at least one second shear surface opposite the at least one first shear surface, the shear surfaces separated by at least one annular space; magnetorheological fluid in an MR fluid chamber including the at least one annular space between the at least one first shear surface and the at least one second shear surface, the MR fluid configured to generate a variable amount of torque transmission between the rotors when subjected to a magnetic field; and at least one coil connected to the power receiving device and supported by the magnetic core, the at least one coil actuatable to deliver a magnetic field through the MR fluid, the magnetic field following a path comprising the magnetic core, the at least one first shear surface and the at least one second shear surface; wherein one of the rotors is adapted to be coupled to a power input and the other of the rotors is adapted to be connected to an output whereby actuation of the at least one coil results in a variation of torque transmission between the rotors.

Still further in accordance with the third embodiment, the at least one first shear surface comprises at least one first drum, and further wherein the at least one second shear surface comprises at least one second drum.

Still further in accordance with the third embodiment, there are a plurality of the first drum, a plurality of the second drum, the first drums being intertwined with the second drums.

Still further in accordance with the third embodiment, the first drums are supported on one side of a first drum holder, the MR fluid chamber including a hollow chamber being on an opposite side of the first drum holder, and at least one first fluid passage being defined through the first drum holder.

Still further in accordance with the third embodiment, the second drums are supported by a second drum holder, the MR fluid chamber further including at least one second fluid passage being defined through the second drum holder.

Still further in accordance with the third embodiment, a magnetorheological fluid path is sequentially defined in the MR fluid chamber by the at least one annular space, the first fluid passages, the hollow chamber, fluid passages in the outer magnetic core, a space outward of the drums, and the second fluid passages.

Still further in accordance with the third embodiment, the space outward of the drums is an inner cavity of a cover of the first rotor.

Still further in accordance with the third embodiment, heat exchange fins are on an outer surface of the cover.

Still further in accordance with the third embodiment, an opening in the cover is open to the MR fluid chamber, the opening being sealed closed by a flexible membrane.

Still further in accordance with the third embodiment, the opening opens to an expansion chamber, a resilient material being in the expansion chamber to selectively exert a biasing force on the flexible membrane.

Still further in accordance with the third embodiment, at least one permanent magnet is supported by the annular wall and delivering a magnetic field through the MR fluid when no other magnetic field are present, wherein the at least one coil is actuatable to deliver a magnetic field redirecting the magnetic field of the at least one permanent magnet away from the MR fluid in order to decrease an apparent magnetic field in the MR fluid.

Still further in accordance with the third embodiment, one of the rotors is connected to an energy recovery device to recover energy with an output of one of the rotors.

Still further in accordance with the third embodiment, a first seal is connected to the stator, and in sealing engagement on an output shaft of the second rotor to bound the MR fluid chamber between the stator and the output shaft, a second seal being connected to the stator and in sealing engagement on the output shaft, such that a non-MR oil chamber is defined between the first seal, the second seal, the stator and the shaft, at least one bearing between the output shaft and the stator being located outside of the non-MR oil chamber and of the MR fluid chamber.

Still further in accordance with the third embodiment, at least one permanent magnet emits a magnetic field in the non-MR oil chamber to attract MR fluid leaking into the non-MR oil chamber.

Still further in accordance with the third embodiment, one translational joint supports the second rotor such that the second rotor is axially movable away from the first rotor to separate the shear surfaces from one another.

Still further in accordance with the third embodiment, the at least one fluid gap is between the power emitting device and the power receiving device is a radial fluid gap.

Still further in accordance with the third embodiment, the at least one fluid gap between the power emitting device and the power receiving device is an axial fluid gap.

DETAILED DESCRIPTION

Figure 1:
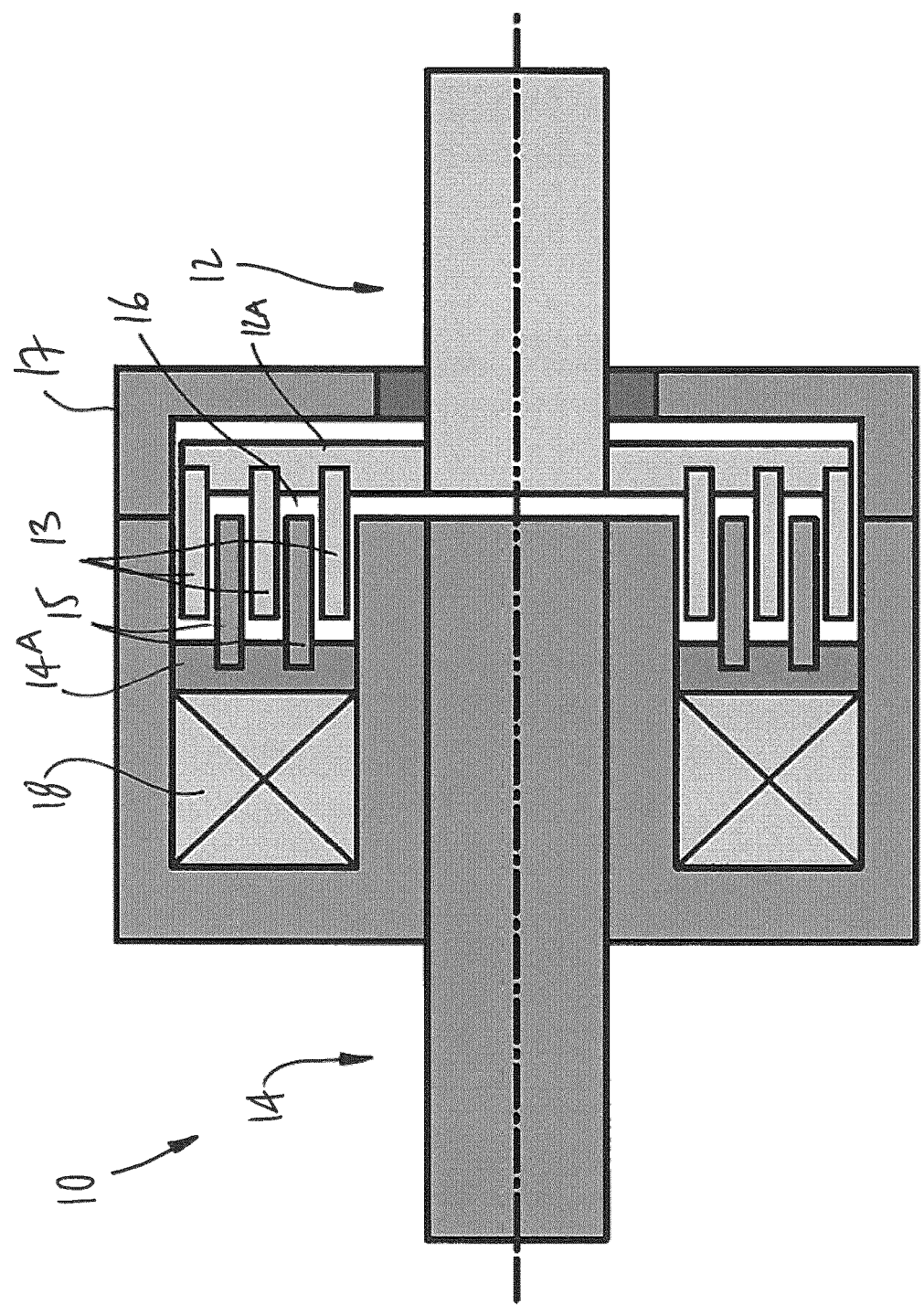
FIG. 1 is a schematic view of a generic magnetorheological (MR) fluid clutch apparatus, incorporating features of the present disclosure.

Referring to the drawings and more particularly to FIG. 1, there is illustrated a generic magnetorheological (MR) fluid clutch apparatus 10 configured to provide a mechanical output force based on a received input current. The MR fluid clutch apparatus 10 of FIG. 1 is a simplified representation of a MR fluid clutch apparatus that may be used in the systems described hereinafter. The MR fluid clutch apparatus that is used in the systems described hereinafter may have additional components and features, such as redundant electromagnets, MR fluid expansion systems, etc.

The MR fluid clutch apparatus 10 has a driving member 12 with a disk 12A from which project drums 13 in an axial direction, this assembly also known as input rotor. The MR fluid clutch apparatus 10 also has a driven member 14 with a disk 14A from which project drums 15 intertwined with the drums 13 to define an annular chamber(s) filled with an MR fluid 16. The assembly of the driven member 14 and drums 15 is also known as the output rotor. The annular chamber is delimited by a casing 17 that is integral to the driven member 14, and thus some surfaces of the casing 17 opposite the drums 13 are known as shear surfaces as they will collaborate with the drums 13 during torque transmission, as described below.

In the example of FIG. 1, the driving member 12 may be an input shaft in mechanical communication with a power input, and driven member 14 may be in mechanical communication with a power output (i.e., force output, torque output). MR fluid 16 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces—i.e., that of the drums 13 on the driving side, and that of the drums 15 and of the shear surfaces of the casing 17 in the annular chamber. The magnetic field intensity mainly affects the yield shear stress of the MR fluid. The yield shear stress of the fluid when in its active ("on") state may be controlled by varying the magnetic field intensity produced by electromagnet 18 integrated in the casing 17, i.e., the input current, via the use of a controller. Accordingly, the MR fluid's ability to transmit force can be controlled with the electromagnet 18, thereby acting as a clutch between the members 12 and 14. The electromagnet 18 is configured to vary the strength of the magnetic field such that the friction between the members 12 and 14 may be low enough to allow the driving member 12 to freely rotate relative to the driven member 14 and vice versa, i.e., in controlled slippage.

The driving member 12 is driven at a desired speed by a power source, like a rotary geared electric motor, and the output rotor is connected to a mechanical device to be controlled. The torque transmitted by the MR fluid clutch apparatus 10 is related to the intensity of the magnetic field passing through the MR fluid. The magnetic field intensity is modulated by a coil 18.

Figure 2:
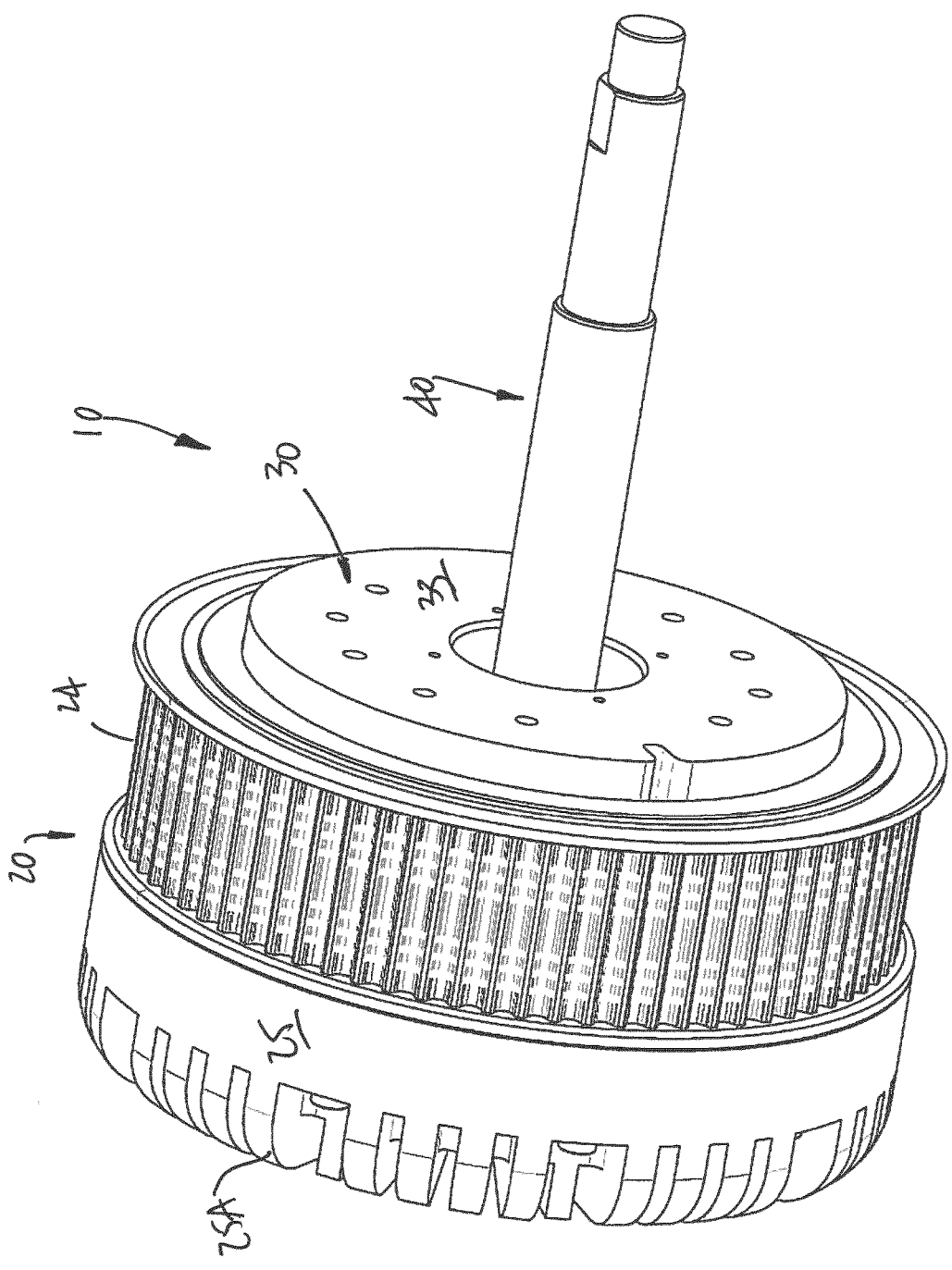
FIG. 2 is a perspective view of an MR fluid clutch apparatus of the present disclosure, as assembled.
Figure 3:
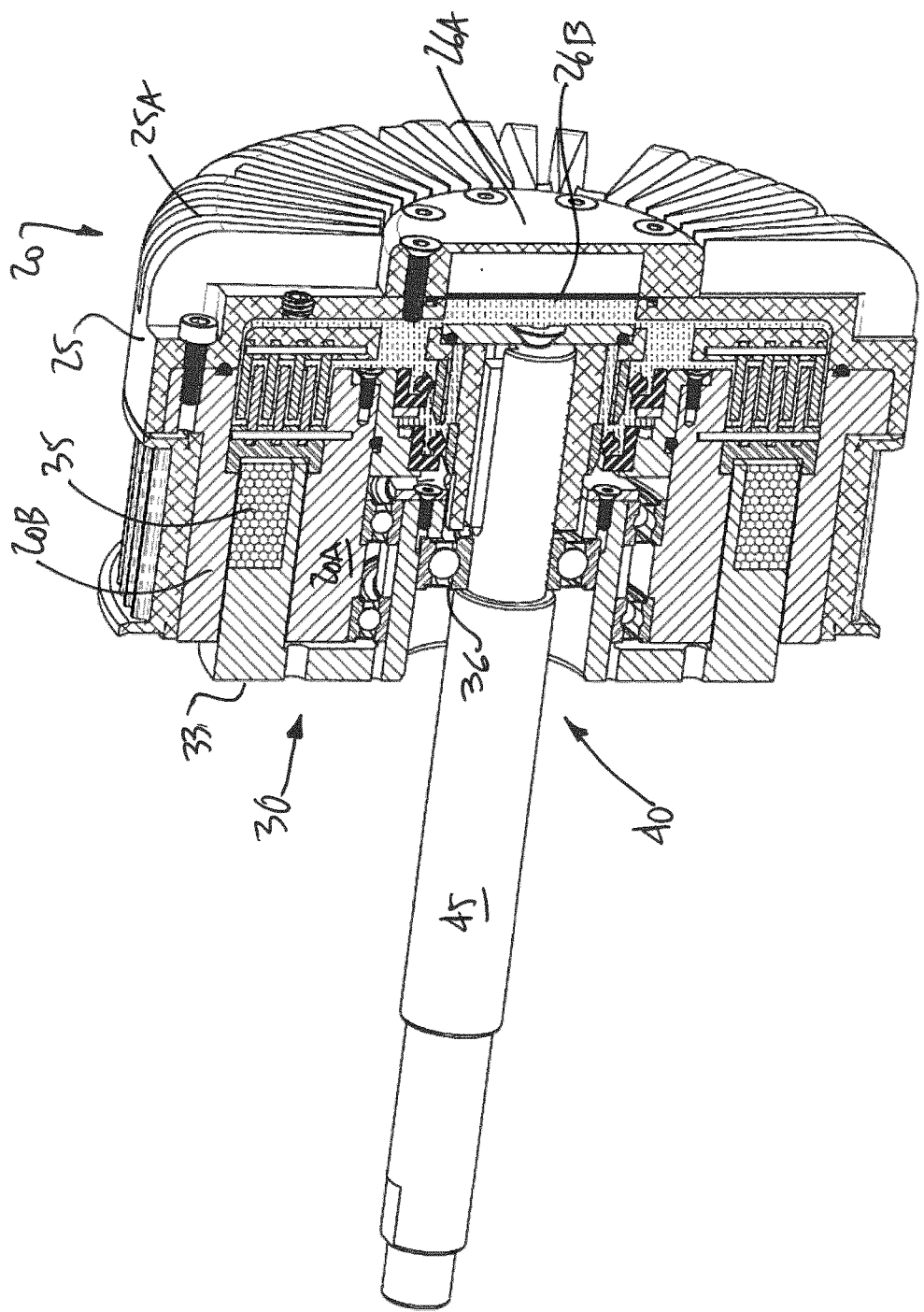
FIG. 3 is a partly sectioned view of the MR fluid clutch apparatus of FIG. 2.
Figure 4:
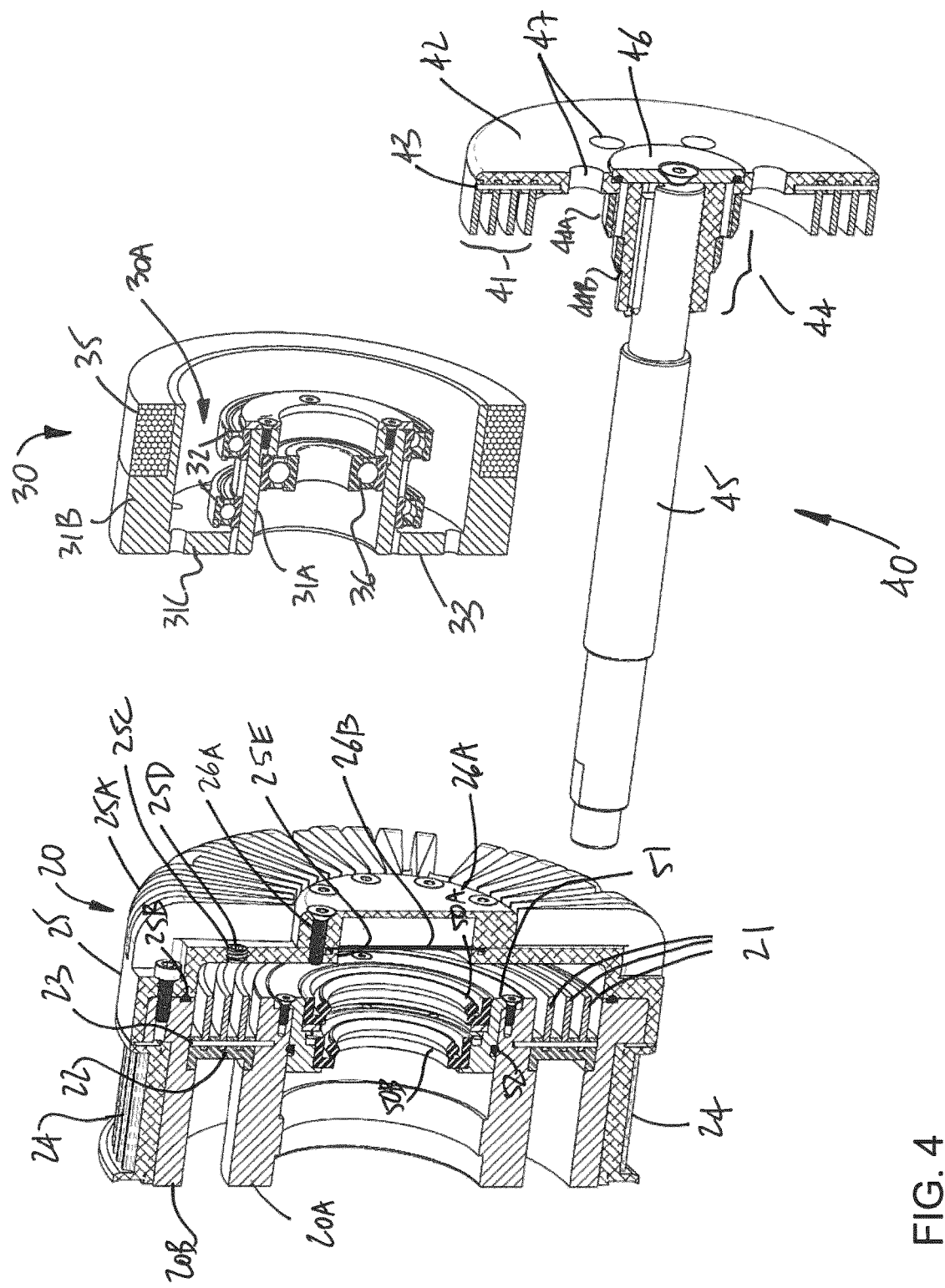
FIG. 4 is an exploded view of the MR fluid clutch apparatus of FIG. 2.

Referring to FIGS. 2, 3 and 4, the MR fluid clutch apparatus is generally shown at 10 as a whole. The MR fluid clutch apparatus 10 has an input rotor 20, also known as the driving member, a stator 30 (including a coil), and an output rotor 40 also known as the driven member, and a MR fluid is located in an MR fluid chamber that is defined in the free space including that between the drums of the rotor 20 and the rotor 40.

The input rotor 20 may be driven at a constant or variable speed prescribed by a rotary power source, not shown, like a rotary geared electric motor. The output rotor 40 is connected to a mechanical output, not shown, to be controlled. When a current circulates in the coil of the stator 30 as described hereinafter, a magnetic field is induced in the stator 30 and passes through the drums and the MR fluid. Then, a torque, dependent on the magnetic field intensity, is transmitted from the input rotor 20 to the output rotor 40 by shearing the MR fluid in between the drums. Although the description that follows indicates that the rotor 20 is the input rotor and the rotor 40 is the output rotor, it is pointed out that the rotor 20 could be the output rotor and the rotor 40 could be the input rotor. However, for the sake of clarity and simplicity and to avoid unnecessary redundancy, the description will pursue with "input rotor 20" and "output rotor 40".

As best seen in FIGS. 3 and 4, the input rotor 20 has an inner magnetic core 20A and an outer magnetic core 20B, spaced apart from one another. The inner magnetic core 20A and outer magnetic core 20B are made of a ferromagnetic material that may have a high permeability, a high magnetization saturation, a high electrical resistivity and low hysteresis, such as silicon iron. Materials having a high electrical resistivity allow the magnetic field to establish faster by minimizing Eddy current and thus enhanced dynamic performance is achieved.

Cylindrical input drums 21 (FIG. 4) are secured to a drum holder 22 (also known as disc, plate, ring, etc), with the drum holder 22 spanning the radial space between the inner magnetic core 20A and the outer magnetic core 20B. In an embodiment, the drums 21 are in a tight-fit assembly in channels of the drum holder 22 and dowel pins 23 pass through all drums 21. The dowel pins 23 may also penetrate the inner magnetic core 20A, as shown in FIGS. 3 and 4. The drum holder 22 may consist of a non-ferromagnetic material to minimize the magnetic field passing through it and may also have a high electrical resistivity to minimize resistive loss during transient operation of the MR clutch apparatus 10.

In an example among many others, the input rotor 20 may be driven by a power source through a timing-belt pulley, or any other driving member, like a chain sprocket, a gear, a flat belt pulley or a V-belt pulley. For illustrative purposes, a pulley portion 24 is provided for interconnection with a belt (not shown), the pulley portion 24 being a toothed pulley for cooperation with a timing belt (a.k.a., toothed, cogged, synchronous belt). The pulley portion 24 may be tight-fitted or glued or positively locked to the outer magnetic core 20B, using mechanical fasteners, or the like.

A cover 25 is fixed to the outer magnetic core 20B, and in an embodiment made of aluminum for cooling purposes. Thermal fins 25A are present on the cover 25 so that the MR fluid clutch apparatus 10 is cooled down by forced convection when the input rotor 20 is driven at a constant speed. The thermal fins 25A help to decrease the operating temperature of the MR fluid and may thus improve the life of the MR fluid clutch apparatus 10. The cover 25 may press a face static seal 25B onto the outer magnetic core 20B to prevent MR fluid leakage. Fill ports 25C may be defined through the cover 25, to fill the MR fluid clutch apparatus 10 with MR fluid. As illustrated, the fill ports 25C may be tapped and plugged using sealed set screws 25D among other solutions.

A central hole 25E in the cover 25 is closed by an expansion chamber cap 26A equipped with a flexible membrane 26B to allow MR fluid expansion during either temperature increase or MR fluid phase transition when aged. To counter the bulging of the membrane 26B due to the MR fluid, some compliant material 26C, such as polyurethane foam, may be placed in the empty expansion volume between the expansion chamber cap 26A and the flexible membrane 26B. The compliant material 26C therefore exerts a biasing pressure on the membrane 26B. Also, a vent hole and/or relief device may be present in the expansion chamber cap 26A to avoid excessive pressure build up in the empty expansion volume.

Still referring to FIGS. 3 and 4, the stator 30 is made of a ferromagnetic material to guide the magnetic field. The stator 30 may have an annular body with an annular cavity 30A formed in its U-shaped section. The inner magnetic core 20A is received in the annular cavity 30A, which may be defined by an inner annular wall 31A, an outer annular wall 31B, and a radial wall 31C, all of which may be a single monolithic piece. The inner magnetic core 20A is rotatably supported by one or more bearings 32, a pair being shown in FIGS. 3 and 4. Although the bearings 32 are shown located between the inner magnetic core 20A and the stator 30, inward of the inner magnetic core 20A, it is considered to position the bearings 32 elsewhere, such as in radial fluid gaps described below. The stator 30 is for instance connected to a structure via bores on its outer face 33 (that is part of the radial wall 31C), and is thus the immovable component of the MR fluid clutch apparatus 10 relative to the structure.

Figure 5:
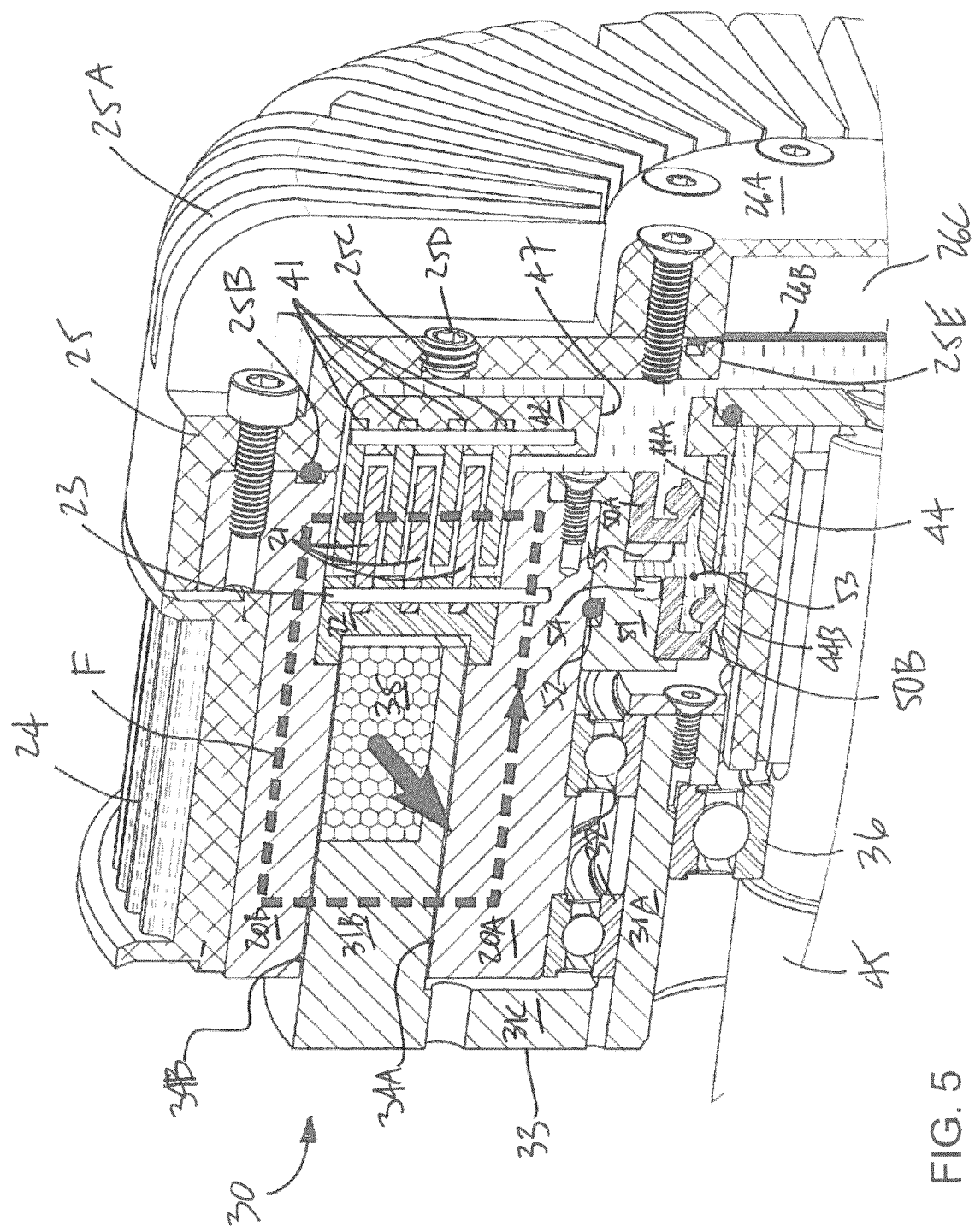
FIG. 5 is an enlarged view of the MR fluid clutch apparatus of FIG. 2, showing a magnetic field induced by a coil.
Figure 15:
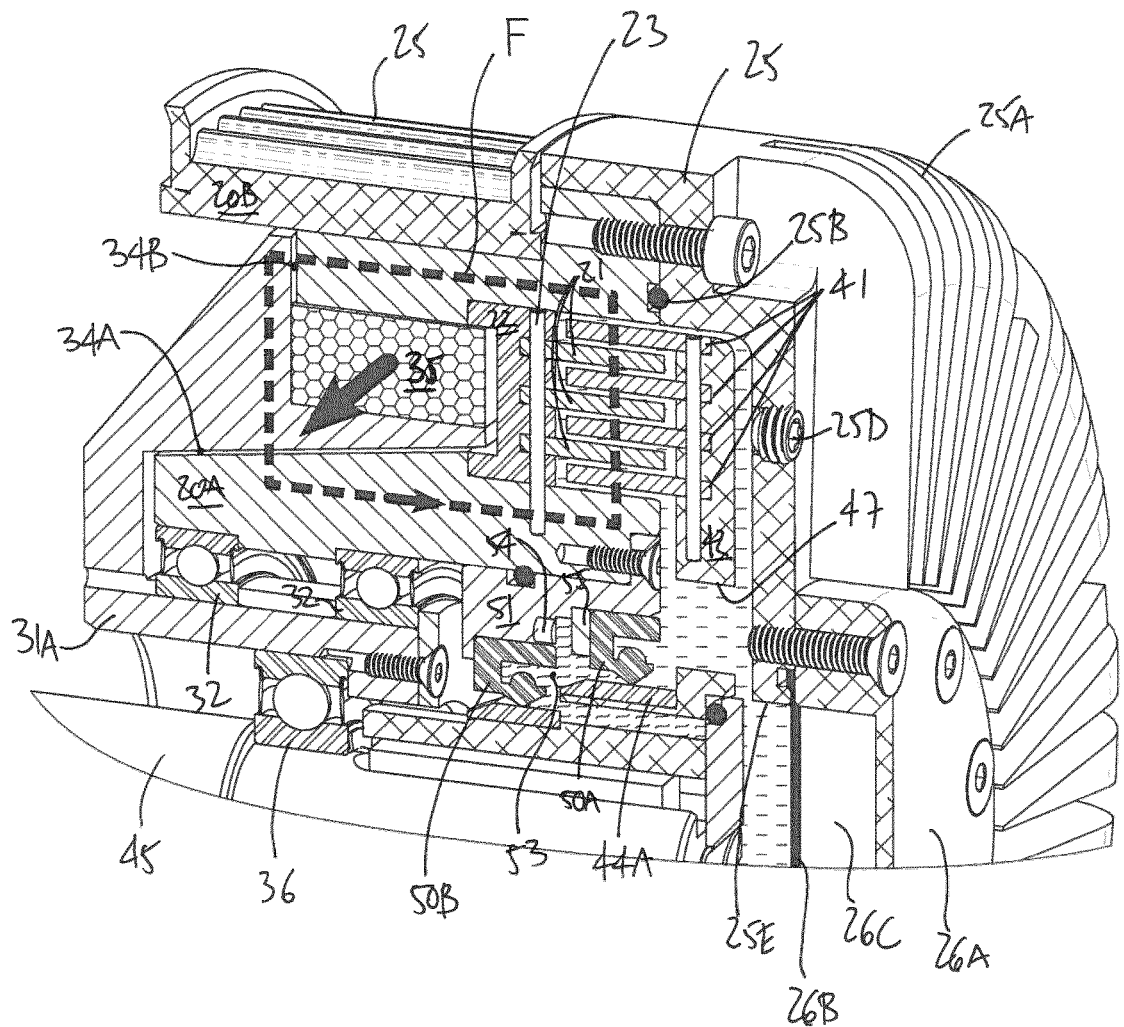
FIG. 15 is an enlarged view of a MR fluid clutch apparatus similar to that of FIG. 2, but non-radial gaps, in accordance with another embodiment of the present disclosure.

As best seen in FIG. 5, the stator 30 is sized such that fluid gaps 34A and 34B are defined between the stator 30, and the inner magnetic core 20A and outer magnetic core 20B, respectively. The fluid gaps 34A and 34B of FIG. 5 are said to be radial, in that they extend in an axial direction for a fixed radial position. However, it is considered to have axial gaps or a combination of axial, radial or angled gaps instead. To illustrate this, FIG. 15 shows an MR fluid clutch apparatus sharing many components with the MR fluid clutch apparatus 10 of FIGS. 2-5 (like reference numerals representing like components), but with the gap 34A between the inner magnetic core 20A and the stator 30 being angled (i.e., varying axial and radial coordinates). The gap 34B between the outer magnetic core 20B and the stator 30 is axial, i.e., it extends in a radial direction for a fixed axial position. Other arrangements are also contemplated, for instance with the gap 34A being axial or radial and/or with the gap 34B being angled or radial.

The fluid gaps 34A and 34B, during use, are filled with a fluid, such as air and other gases, or lubricating and/or cooling liquids like oil, grease, etc. The fluid in the gaps 34A and 34B is a non-MR fluid (one or more non-MR fluids). Hence, the radial fluid gaps 34A and 34B may be free of solids during use, or mostly free from solids. Stated differently the fluid gaps are without slip-rings, or slip-ringless. Some protective seals may be present to block penetration of solids, but the gaps 34A and 34B are generally free of solids. Coil 35 is secured to the annular body of the stator 30, for instance using an adhesive. It is contemplated to provide a slot through the stator 30 for passing wires connected to the coil 35, for powering the MR fluid clutch apparatus 10. The stator 30 further comprises one or more bearings 36 for rotatably supporting the output rotor 40, as described hereinafter.

The coil 35 may be wound using a high copper factor winding method. A higher copper ratio may lead to improved efficiency. Also considered are winding methods allowing flat wire winding, horizontal stacking, cylindrical stacking, for example. Multilayer PCBA winding is also considered (Heavy Copper PCBA) instead of copper only.

The bearings 32/36 may be greased and may use no-contact seals to limit friction. The bearing arrangement featuring bearing(s) between the input rotor 20 and the stator 30, and separate bearing(s) between the stator 30 and the output rotor 40 enhances the safety of the MR fluid clutch apparatus 10. For example, if the input rotor 20 is jammed with the stator 30, the output rotor 40 is still free to rotate. Inversely, if the output rotor 40 is jammed with the stator 30, the power source that drives the input rotor 20 can still rotate.

The output rotor 40 has cylindrical output drums 41 that are secured to a drum holder 42 (e.g., plate, disc, etc) by a tight-fit assembly on the inner diameter of the drums 41. Dowel pins 43 may pass through the drums 41, among other ways to connect the output drums 41 to the drum holder 42. The output drums 41 are ferromagnetic so that the magnetic field easily passes through them (for example, with an equivalent magnetic flux in each of the drums). The drum holder 42 is made of a non-ferromagnetic material to minimize the magnetic field passing through it, like an aluminum alloy, to reduce the inertia of the output rotor 40.

The drum holder 42 has a shaft interface 44 by which it is connected to a shaft 45. In an embodiment, the shaft interface 44 is a sleeve-like component that is rotationally coupled to the shaft 45, and may have wear sleeves 44A and 44B. The output rotor 40 is locked in rotation to the output shaft 45 by a key or any other locking device (splines, tight-fit, . . . ). A sealed shaft cap 46 is used to axially maintain the output rotor 40 relatively to the output shaft 45 and to prevent MR fluid leakage. A flat portion for a wrench may be defined on the output shaft 45 to ease screwing the shaft cap 46. This arrangement is one among others to connect the drum holder 42 to the shaft 45, such that the shaft 45 may receive the driving actuation from the input rotor 20 via the drum holder 42. The drum holder 42 further comprises throughbores 47 that may be circumferentially distributed therein to allow MR fluid circulation. As shown in FIG. 3, the throughbores 47 are located radially between the drums 41 and the shaft interface 44.

The MR fluid clutch apparatus 10 may use an odd number of drums 21 and 42, for example a mean value of about 7. More or less drums may be used according to the application. Using more than one drum may assist in decreasing the overall volume and weight of the MR fluid clutch apparatus 10 for a given desired torque and a given diameter, as using multiple drums helps to reduce both the drum length and the cross-sections of the inner magnetic core 20A and the outer magnetic core 20B. At the same time, the time response of the magnetic circuit is improved because the Eddy currents are minimized when the cross-sections of the magnetic cores are lower. Compared to a multi-disc configuration, a multi-drum configuration allows a simplified assembly and a better tolerance on the MR fluid gaps.

Referring to FIG. 5, the magnetic field F induced by the coil 35 follows a closed path which goes through the annular wall 31B of the stator 30, the radial fluid gap 34B, the outer magnetic core 20B, the MR fluid, the drums 21 and 41, the inner magnetic core 20A, and the radial fluid gap 34A. The radial fluid gaps 34A and 34B allow the coil 35 to be energized without the use of slip rings. In fact, the typical friction slip rings are replaced by magnetic slip rings performed by the two radial fluid gaps 34A and 34B. The radial fluid gaps 34A and 34B are radial rather than axial for two reasons. Firstly, radial tolerance is readily reached so that the fluid gaps can be substantially small (<0.2 mm) and thus the additional number of turns in the coil required to magnetize the fluid gaps 34A and 34B is minimized. Secondly, the magnetic attractive force in the fluid gaps 34A and 34B between the stator 30 and both magnetic cores 20A and 20B is nearly cancelled due to the rotational symmetry of the fluid gaps 34A and 34B. If the fluid gaps were axial (as in FIG. 15), magnetic attractive forces could be present and could load the bearings axially.

Figure 6:
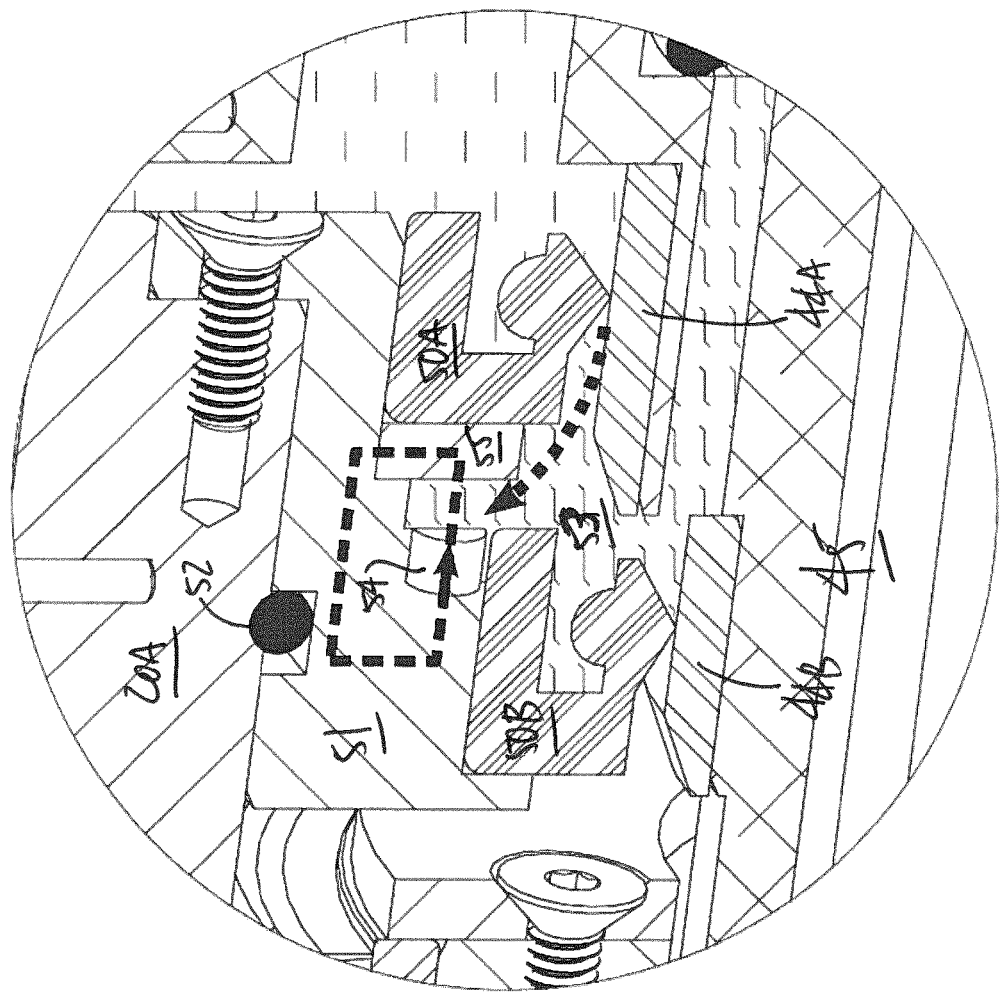
FIG. 6 is an enlarged view of a dynamic seal system of the MR fluid clutch apparatus of FIG. 2.

Referring to FIGS. 5 and 6, the MR fluid clutch apparatus 10 has a two-stage dynamic sealing system that is used to reduce the risk that the MR fluid contaminates the bearings 32/36. The dynamic sealing system may have one or more dynamic lip seals 50A and 50B secured in a common seal support 51. Seal support 51 could also be integrated in the inner magnetic core 20A. The seal support 51 may be made of ferromagnetic material. In the illustrated embodiment, the seal support 51 is slide-fitted into engagement with the inner magnetic core 20A of the input rotor 20, and a static seal 52 is used to contain the MR fluid in the MR fluid chamber. Both dynamic seals 50A and 50B are secured to the input rotor 20 and rotate with it. The seals 50A and 50B have their lips in contact with the wear sleeves 44A and 44B that are part of the shaft interface 44, and may for instance be tight-fitted on the output rotor 40. The dynamic seal of larger diameter 50A is directly in contact with the MR fluid. As shown in the Figures, the throughbores 47 may be positioned in axial alignment with the dynamic seal 50A and allow MR fluid circulation inside the whole MR fluid chamber for fluid to age more evenly by allowing fluid circulation. In the gap between the dynamic seals 50A and 50B, an oil chamber 53 is formed and may be filled with lubrication oil that has a similar composition as the oil used in the MR fluid, but without the ferromagnetic particles. The oil chamber 53 may be filled with this oil through holes in the drum holder 42 of the output rotor 40, for example.

Permanent magnets 54 may be inserted into equally spaced blind holes in the seal support 51, and may for example be cylindrical in shape. The permanent magnets 54 face the larger dynamic seal 50A and the magnetic polarity may alternate from one magnet 54 to the other. A single permanent ring magnet, axially magnetized, may be used instead of the plurality of permanent magnets 54, as long as it does not hamper the magnetic field of the coil 35. For this purpose, a ferromagnetic plate 55 placed on the back of the dynamic seal 50A is used to redirect the magnetic flux of the magnets 54 so that the magnetic field induced by the permanent magnets 54 does not spread to the MR fluid chamber. In normal operation, the wear of the smaller dynamic seal 50B may be lower than the wear of the larger dynamic seal 50A due to the absence or relatively low concentration of the ferromagnetic particles in the oil chamber 53, which ferromagnetic particles may be abrasive. In case of a leak through the larger dynamic seal 50A, some ferromagnetic particles may migrate to the oil chamber 53 but are then attracted by the magnets 54 in a region delimited by the magnets 54 and the ferromagnetic plate 55. This magnetic attraction keeps at least some of the ferromagnetic particles away from the small dynamic seal 50B and thus slows down the abrasion of the small dynamic seal 50B. It is also contemplated to provide a drainage channel to evacuate any MR fluid away from the bearings 32/36, the centrifugal forces assisting in draining the MR fluid away. Thus, the life and the safety of the MR fluid clutch apparatus 10 may be enhanced by the use of this type of dynamic sealing system described above.

Other sealing arrangements are considered. For example, according to another dynamic sealing embodiment, only one dynamic seal 50 may be used to limit the overall friction of the MR fluid clutch apparatus 10. In yet another dynamic sealing embodiment, the oil chamber 53 may be replaced by a grease chamber. In such a case, the arrangement of magnets 54 and ferromagnetic plate 55 may not be required as the grease would form a barrier against the penetration of ferromagnetic particle penetration. Such a grease chamber could be sealed by a labyrinth seal.

As the stator 30 is fixed in rotation while the input rotor 20 and output rotor 40 rotate, some additional components may be fixed to the stator 30. For example, sensors can be installed on the stator 30. Such sensors include a position encoder between the stator 30 and the output rotor 40. Another contemplated sensor is a torque sensor between the stator 30 and the shaft 45. These sensors may allow the validation of the efficiency of the MR fluid clutch apparatus 10 and may detect fading, hence end of life of the MR fluid. Other sensors include a magnetic flux sensor to improve torque control by boosting the initial current, and to perform predictive failure assessment. Temperature sensors may also be present for safety reasons. For example, sensors may monitor the fluid temperature and limit the performance of the apparatus 10 in case of excessive temperatures that could cause the MR fluid to age or deteriorate prematurely.

Furthermore, sensors can be installed in the rotating portions while getting the energy from the coil 35 installed in the stator 30, with a wireless communication system broadcasting wireless information to a PCBA.

An embodiment that the fixed stator 30 provides is the possibility of installing a brake between the fixed stator 30 of the clutch apparatus 10 and the input rotor 20 or the output rotor 40 (including the shaft 45). The presence of a brake may limit the wear of the MR fluid when only a braking force is enough to ensure proper system function.

Figure 7:
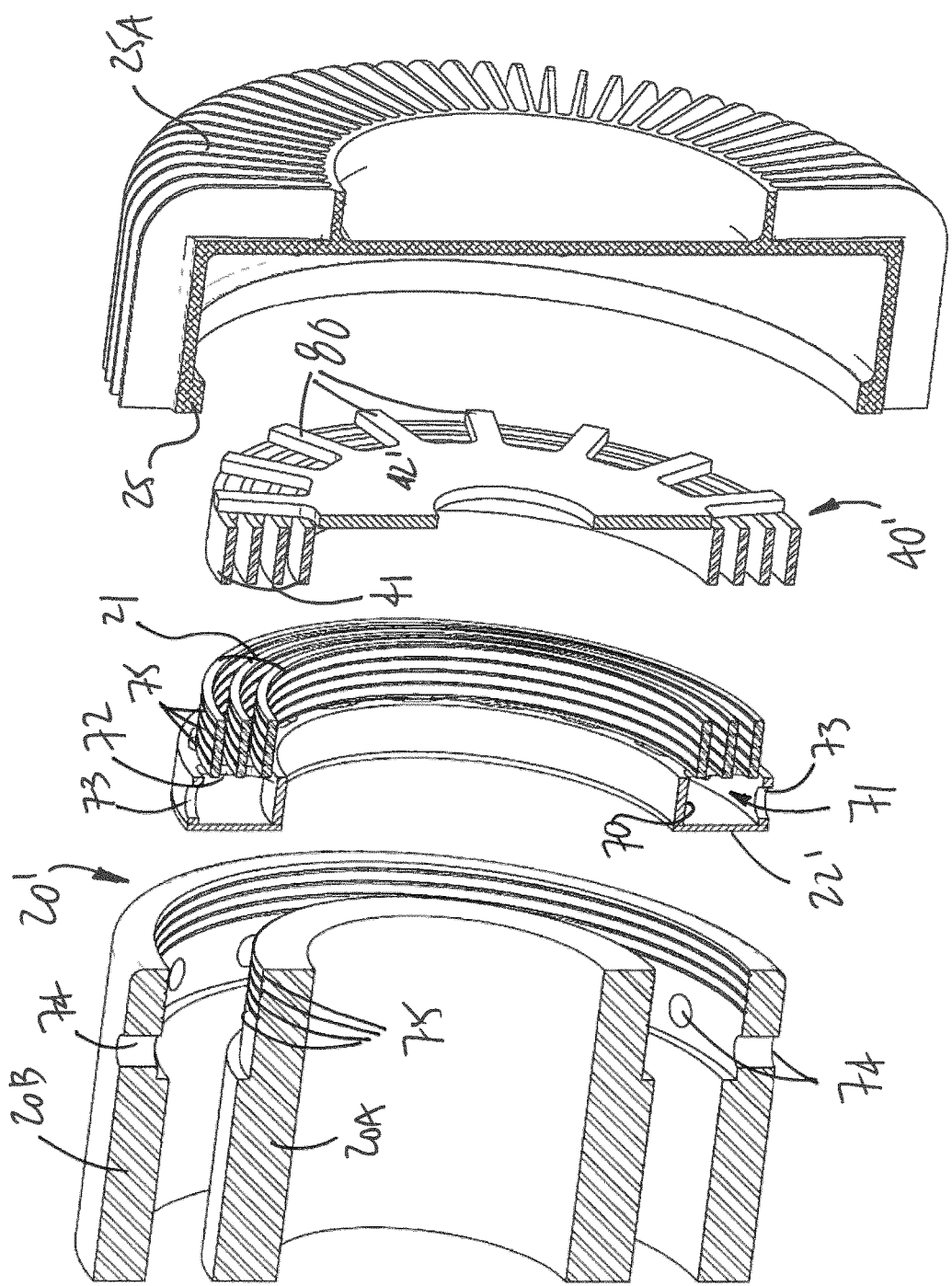
FIG. 7 is an exploded view of an MR fluid clutch apparatus in accordance with another embodiment of the present disclosure.
Figure 8:
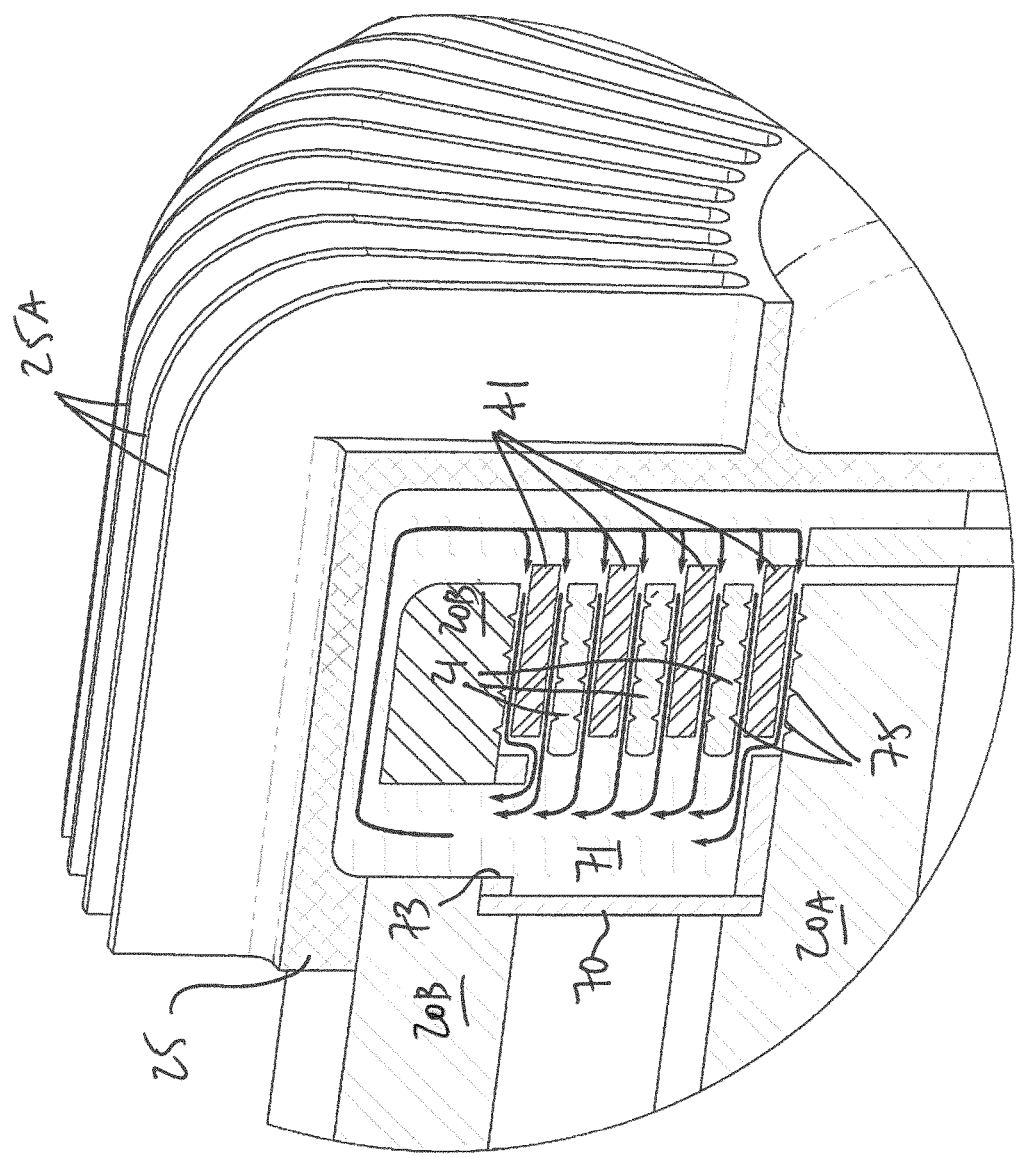
FIG. 8 is an enlarged perspective view of MR fluid flow in the MR fluid clutch apparatus of FIG. 7.

Referring to FIGS. 7 and 8, alternative configurations of the input rotor and output rotor are illustrated, respectively as 20' and 40'. For the sake of clarity, many components of the complete MR fluid clutch apparatus 10 have been removed from FIGS. 7 and 8, such as the stator 30, the dynamic seal system, etc, for focus to be on the distinguishing features.

One distinguishing feature in the input rotor 20' is the drum holder 22' as it has a hollow annular body 70, forming an annular cavity 71. The input drums 21 are secured to webs 72 to form fluid passages. As such, the MR fluid may flow past the webs 72 and into the annular cavity 71. The webs 72 are radially oriented in the illustrated embodiment, although other orientations are contemplated. Also, the webs 72 constitute one among many ways to define passages for the flow of the MR fluid. Radial outlets 73 are defined on an outer circumferential wall of the drum holder 22', and are in register with holes 74 in the outer magnetic core 20B. Pumping action may be induced by helical grooves 75 on the input drums 21, among other ways.

Likewise, the output rotor 40' has a drum holder 42' having a plurality of webs 80 at the end of a disc body, for supporting the output drums 41. Again, the webs 80 are radially oriented in the illustrated embodiment, although other orientations are contemplated. Also, the webs 80 constitute one among many ways to define passages for the flow of the MR fluid.

As shown in FIG. 8, MR fluid circulates in the MR fluid clutch apparatus 10 by a parallel pumping action created by the helical grooves 75 on the input drums 21, and possibly on shear surfaces of the magnetic core 20, as illustrated. The heat generated in the shear interfaces is extracted by making the MR fluid flow reach the cooling path, including a flow along the finned cover 25, to then recycle between the drums 21/41. Hence, by having the MR fluid circulate in parallel instead of in series (i.e., from one drum to another), the amount of time during which the MR fluid is between the drums 21/41, before going in the cooling path, is reduced.

The radial outlets 73 and the corresponding holes 74 in the outer magnetic core 20B have a sufficient diameter so that when a magnetic field is applied, the MR fluid in the outlets 73/holes 74 has a sufficiently low viscosity to flow through.

The drums 21 and 41 can be connected in any appropriate way to the webs 72 and 80, respectively. For example, laser welding may be used. Like the drum holders 22 and 42, the drum holders 22' and 42' are made of non-ferromagnetic stainless steel, for example, while the drums 21 and 41 and the magnetic core 20 are made of ferromagnetic steel. The finned cover 25 can be made of aluminum, copper or any other heat-dissipating materials.

Figure 9:
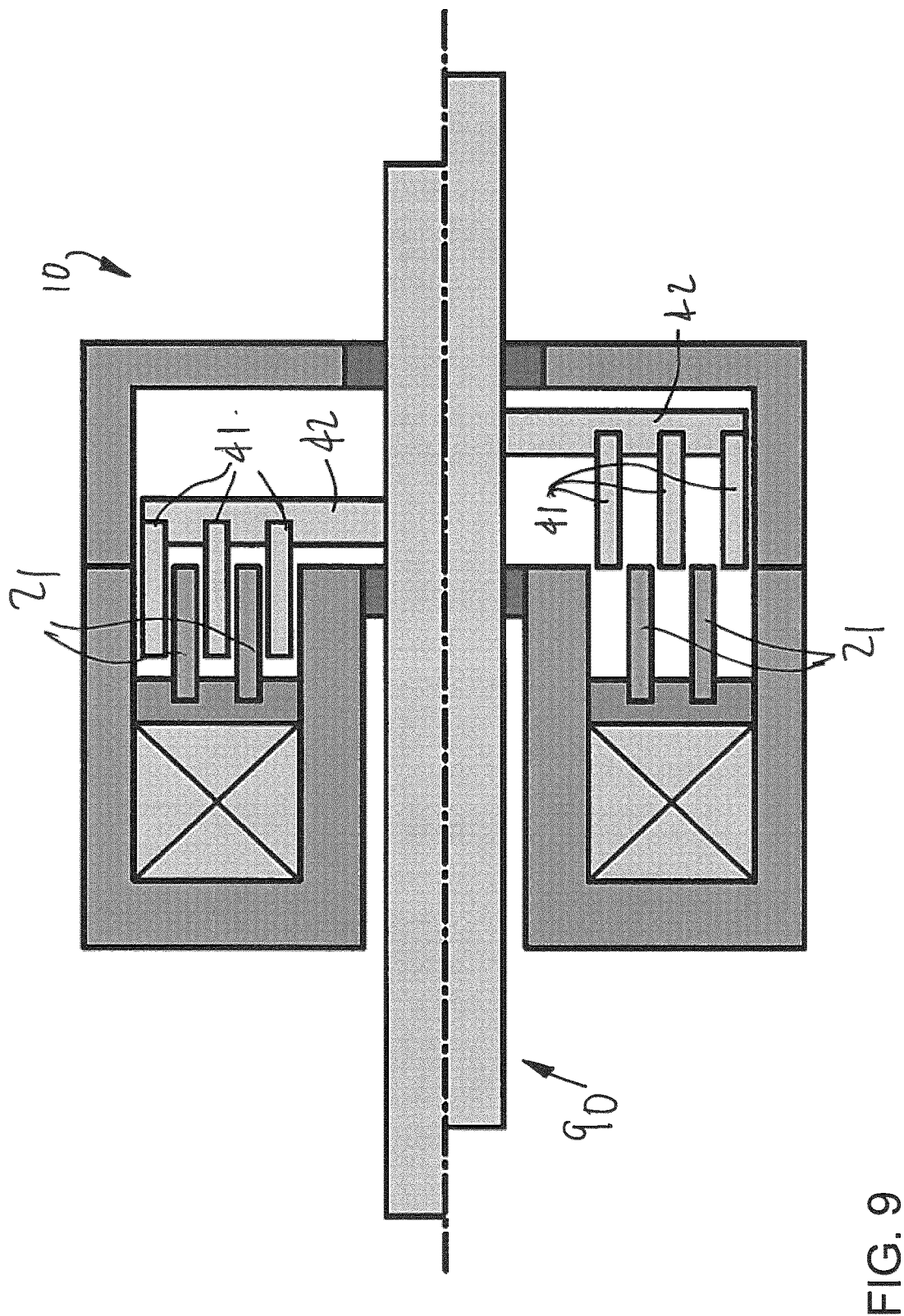
FIG. 9 is a schematic sectional view of an MR fluid clutch apparatus with sliding disengagement of an output rotor

Referring to FIG. 9, it is contemplated to allow axial movement between the input drums 21 and the output drums 41 in order to reduce off-state drag and available max torque without affecting the bandwidth of MR fluid clutch apparatus 10. One contemplated way to achieve this includes the use of a sliding mechanism 90 of the output drum holder 42 on the shaft. The actuation of the sliding mechanism 90 may be controlled by pneumatic, hydraulic pressure going through the center of the shaft or by any other mechanism.

FIG. 9 is a schematic representation in which the engaged axial position is shown in the top half, and the disengaged axial position is in the lower half (i.e., FIG. 9 does not show a shaft separable at its center line).

Thermal management is taken into consideration to enhance the performance of the MR fluid clutch apparatus 10. Different configurations are considered, such as heat pipe integration on the cover 25 to cool down the MR fluid (e.g., copper heat pipe, methanol copper heat pipe)—fluid cooling (gas or liquid) on the cover side is possible because the shaft 45 is single sided —, the use of copper or aluminum for the cover 25 to improve heat dissipation, the use of copper or aluminum for the drum holders 22 and 42 to improve heat extraction from the drums 21 and 41 on the drive or driven side. Other configurations include fins in contact with the MR fluid in the MR fluid chamber to improve heat absorption of the cover 25, using the shaft as part of the cooling management for instance by contact with the inner cylinder support and by using thermal grease to cool down the assembly. The press-fitting of the drums 21 and 41 on the drum holders 22 and 42 may also maximise heat conduction via the holders 22 and 42. A thermal paste could be used to increase the heat transfer on the side opposite to the press fit. Fluid circulation in the gaps 34A and 34B may be induced by a pumping effect to cool down the assembly.

MR fluid exchange management is also enhanced with the MR fluid clutch apparatus 10. Because the clutch apparatus 10 has a static part, i.e., the stator 30, a conduit may be added to the apparatus 10 for fluid exchange on a periodic basis to prevent over-aging of the fluid present in the fluid gap. It is also considered to provide an MR fluid exchange conduit on the cover 25 when the apparatus 10 has a single sided shaft, as with the shaft 45. MR fluid exchange conduit would be used to prevent over-aging of the MR fluid in the MR fluid chamber by exchanging it periodically or constantly. In order to have even shear in every shearing interface, it is contemplated to have drums 21 and 41 of different lengths. The outer drums 21 and 41 would be shorter than the inner drums 21 and 41 in order to have an equal surface for each shearing interface. This would contribute to maintaining relatively even magnetic flux density in each of the shear interfaces.

The MR fluid clutch apparatus 10 enables high torque transmission because of the multi-drum architecture, with low output inertia and/or high torque bandwidth for high dynamic response. The cylindrical/radial fluid gaps 34A and 34B guide the magnetic field instead of using slip rings. The two sets of bearings independently mounting the input rotor 20 and the output rotor 40 to the stator 30 may help to prevent the seizure of the input rotor 20 with the output rotor 40. The dynamic seal system is part of a sealing strategy to mitigate internal seal failure. Cooling by forced air convection resulting from the finned cover 25 of the input rotor 20 may increase MR fluid life by reducing its temperature. Expansion chamber cap 26A mitigates the thermal expansion of the MR fluid. Therefore, the MR fluid clutch apparatus 10 with one or more of these features allows viable and performant controlled slippage actuation systems, such as active suspension devices, single DOF or multi-DOF actuation systems.

In controlled slippage actuation systems, the power source is well known and can be designed to be lightweight by using, for example, a high-speed electric motor coupled with a high-ratio reduction gearbox. However, MR fluid clutch apparatuses are the main components that influence the life, the dynamic performance, the weight and the reliability of the controlled slippage actuation system which are essential aspects to get a viable and performant controlled slippage actuation system that would be competitive with current electric actuation systems. Thus, the proposed MR fluid clutch apparatus 10 includes design features that may satisfy at least some of these aspects.

Unlike MR clutches presented in the literature, the geometry (number of drums, characteristic dimensions, materials selection) of the MR fluid clutch apparatus 10 may increase the torque/mass ratio without increasing the off-state clutch torque. The MR fluid clutch apparatus 10 also improves the reliability of the actuators and their life without weight penalty.

The MR fluid clutch apparatus 10 may be integrated in light controlled-slippage (CSA) actuators, to assist in making them more durable, with high dynamic response and to satisfy the required reliability for the most demanding applications. Thus, the MR fluid clutch apparatus 10 ultimately allows CSA actuators to be used in a wide range of applications (robotics, aerospace, transportation, etc . . . ). The MR fluid clutch apparatus 10 may be used as a multi-turn output mechanism without the use of slip rings. Stated differently, the input rotor 20 and the output rotor 40 are not constrained in rotation by being physically tied to a fixed component. Instead, it is the stator 30 that is physically connected to a fixed component, whereby the input rotor 20 and the output rotor 40 are free from constraints in rotation, and are hence said to be multi-turn in input and output. The stator 30 does not turn while the input rotor 20 is attached to a power source that can make multi turns and the output rotor 40 can provide a multi-turn output.

Figure 10:
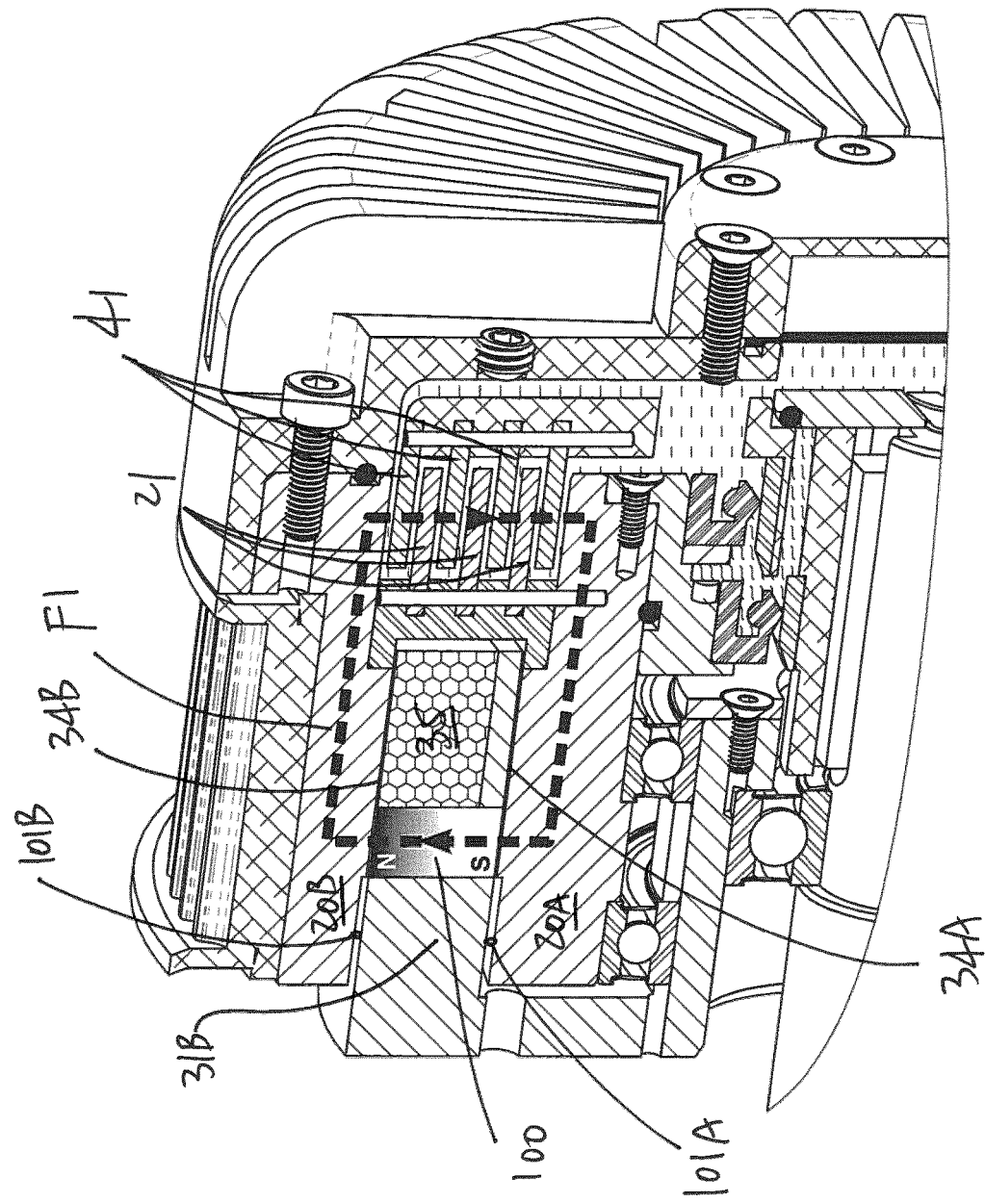
FIG. 10 is a partly sectioned view of the MR fluid clutch apparatus with a permanent magnet with a coil in an unpowered state, in accordance with the present disclosure.
Figure 11:
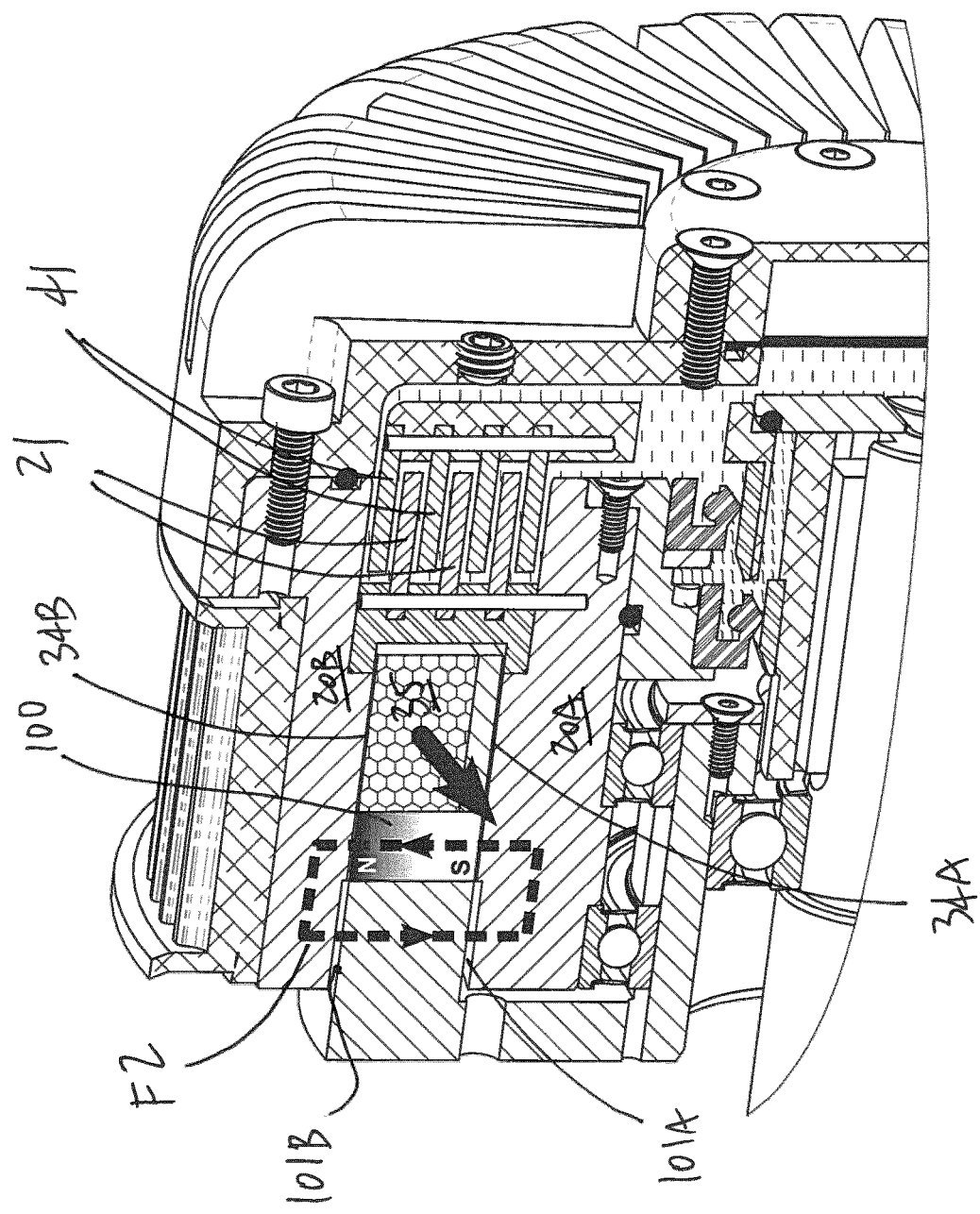
FIG. 11 is a partly sectioned view of the MR fluid clutch apparatus of FIG. 10, with the coil in a powered state.
Figure 12:
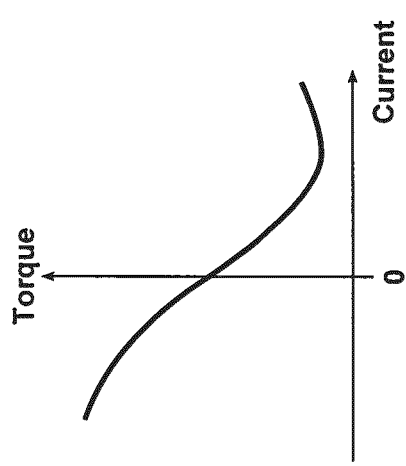
FIG. 12 is a schematic graph of torque as a function of current, for the MR fluid clutch apparatus of FIGS. 10 and 11.

Referring to FIGS. 10-12, the MR fluid clutch apparatus 10 is shown in yet another embodiment. The MR fluid clutch apparatus 10 of FIGS. 10-12 has numerous similar components with the MR fluid clutch apparatus 10 of FIGS. 3 to 6, whereby like elements will bear like numeral references, and their description is not duplicated unnecessarily herein. A distinction lies in the presence of a permanent magnet 100 in the outer annular wall 31B, in addition to the coil 35.

As shown in FIG. 10, the permanent magnet 100 is used to generate a magnetic field F1 in the MR fluid clutch apparatus 10 so that the apparatus 10 can transfer a power-off (i.e. no current in the coil 35) output torque without the need to apply a current via the coil 35. The permanent magnet 100 is radially magnetized and may be a full solid annular part or an assembly of individual magnets (such as cylindrical magnets circumferentially disposed in an annular support). Other radial fluid gaps 101A and 101B, a.k.a. "redirection gaps", separate the annular wall 31B from the inner magnetic core 20A and the outer magnetic core 20B on the side of the annular wall 31B opposite to the permanent magnet 100. Redirection gaps could also be of axial type or a combination of axial, radial or angled types.

When no current is applied to the coil 35, as in FIG. 10, magnetic field F1 is present in the MR fluid according to the described magnetic flux path shown. A relatively smaller amount of magnetic flux circulates through the other radial fluid gaps 101A and 101B, separating the stator 30 from the inner magnetic core 20A and the outer magnetic core 20B. These gaps 101A and 101B are a bit wider than the gaps 34A and 34B, the width being in a radial direction (the width being the difference between radii). The width of the redirection gaps 101A and 101B controls the amount of magnetic flux desired in the MR fluid, a.k.a. the desired power-off torque. If the redirection gaps 101A and 101B are sufficiently wide, almost all the magnetic flux induced by the permanent magnet 100 goes through the MR fluid, leading to a high power-off torque. If the redirection gaps 101A and 101B are radially narrower, the magnetic flux is shared between the MR fluid and the redirection gaps 101A and 101B, leading to a lower power-off torque.

When a current is applied in the coil 35 according to the direction shown in FIG. 11 and the indicated polarity of the permanent magnet 100, the magnetic flux induced by the permanent magnet 100 is redirected in the redirection gaps 101A and 101B as shown by F2, which leads in a decrease of the torque of the MR fluid clutch apparatus 10. At a certain intensity of the coil current, the magnetic flux F1 in the MR fluid can be nearly cancelled and passed this intensity, it will increase again (see FIG. 12). The width of the redirection radial fluid gaps 101A and 101B also controls the size of the winding of the coil 35. If the width is larger, a bigger winding is required to redirect the magnetic flux.

If the current is applied in the reverse direction, the coil 35 assists the permanent magnet 100 in the generation of magnetic flux in the MR fluid, leading to the increase of the torque of the MR clutch apparatus 10, again as shown in FIG. 12.

Accordingly, the MR fluid clutch apparatus 10 has a normally "on state" for the MR fluid, because of the magnetic field induced by the permanent magnet 100 when the coil 35 is not powered. The coil 35 is then powered to cause the MR fluid clutch apparatus 10 to reduce torque transmission and eventually be in an off state with high slippage. This arrangement is useful for example when the MR fluid clutch apparatus 10 must maintain torque transmission in spite of a power outage. The magnetic field of the permanent magnet 100 would be of sufficient magnitude for the MR fluid clutch apparatus 10 to support a load without being powered.

In a contemplated embodiment, a pair of the MR fluid clutch apparatus 10 is used in a CSA system. CSA systems are fully-active and minimally composed of two MR fluid clutch apparatuses such as 10 maintained in slippage by a geared motor that operates at constant or variable speed. The output of the system is controlled by varying the torque transmitted through two counter-rotating MR fluid clutch apparatuses 10. CSA systems combine the advantages of lightweight, high-speed electric gear-motors, with the high dynamic performances of slippage clutch apparatuses. When maintained in slippage, the MR fluid clutch apparatuses 10 decouple the dynamic behavior of geared motors from the outputs resulting in low output inertia and high control quality since the high output inertia of the geared motors is not reflected at the system output, increased force accuracy as the non-linear behaviors induced by the use of geared elements (e.g. cogging, gear backlash, friction) are filtered by the clutch apparatuses, low mass and minimal number of components since loads generated by the main geared motors can be shared between a plurality of outputs, and/or in some applications, high reliability as faulty geared motors can be disconnected from the output following clutch disengagement.

Coupled with a linkage to a suspended (sprung) or flexible mechanical assembly, the system can be used to control the movement of one mass in relation to the other. The CSA system can impose a movement to the lighter (lowest weight) of the sprung or un-sprung weight. Movement can be imposed using various linkage, cables or hydraulic tubing system.

Figure 13:
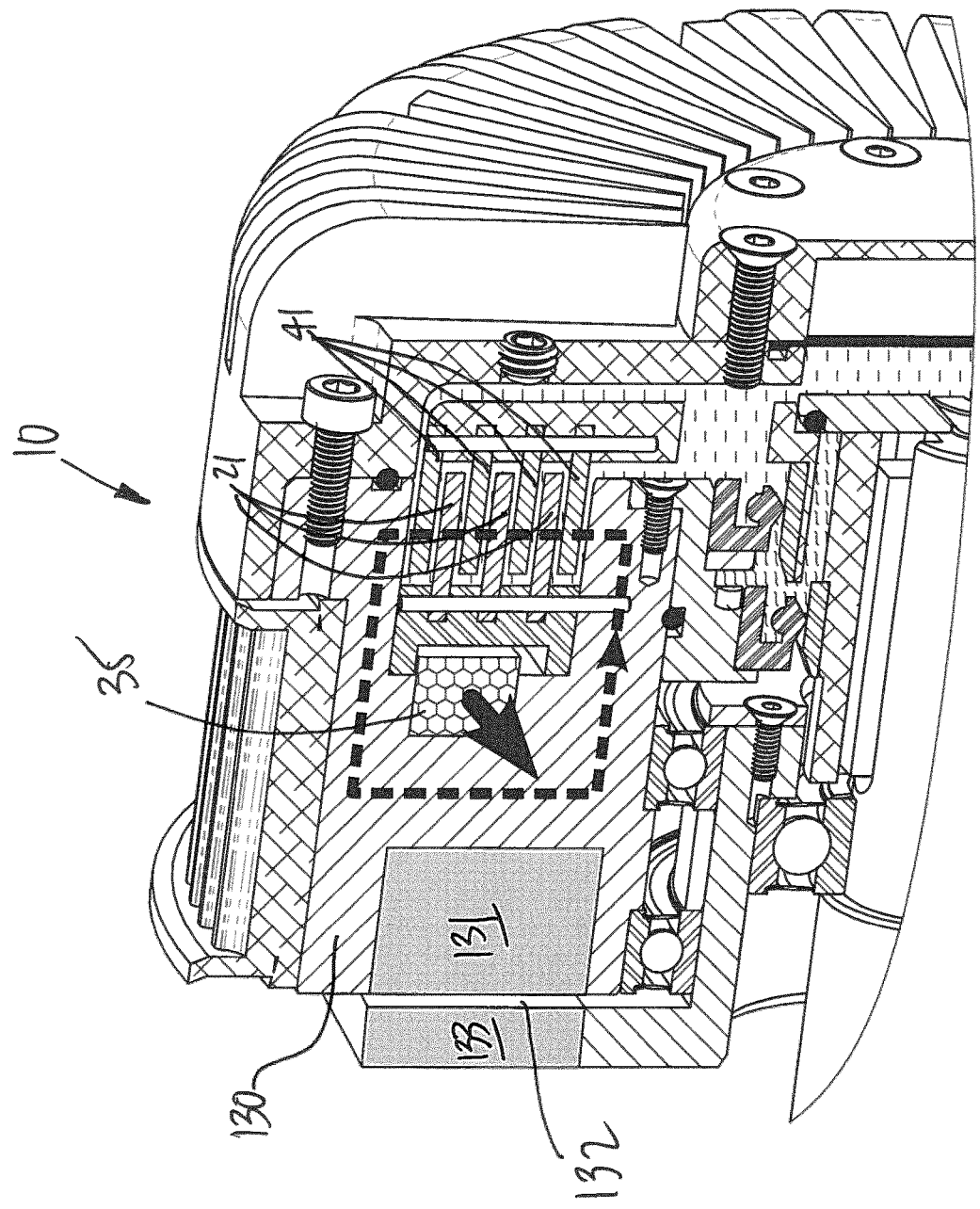
FIG. 13 is a partly sectioned view of an MR fluid clutch apparatus with an axial fluid gap for contactless power transmission, in accordance with the present disclosure.
Figure 14:
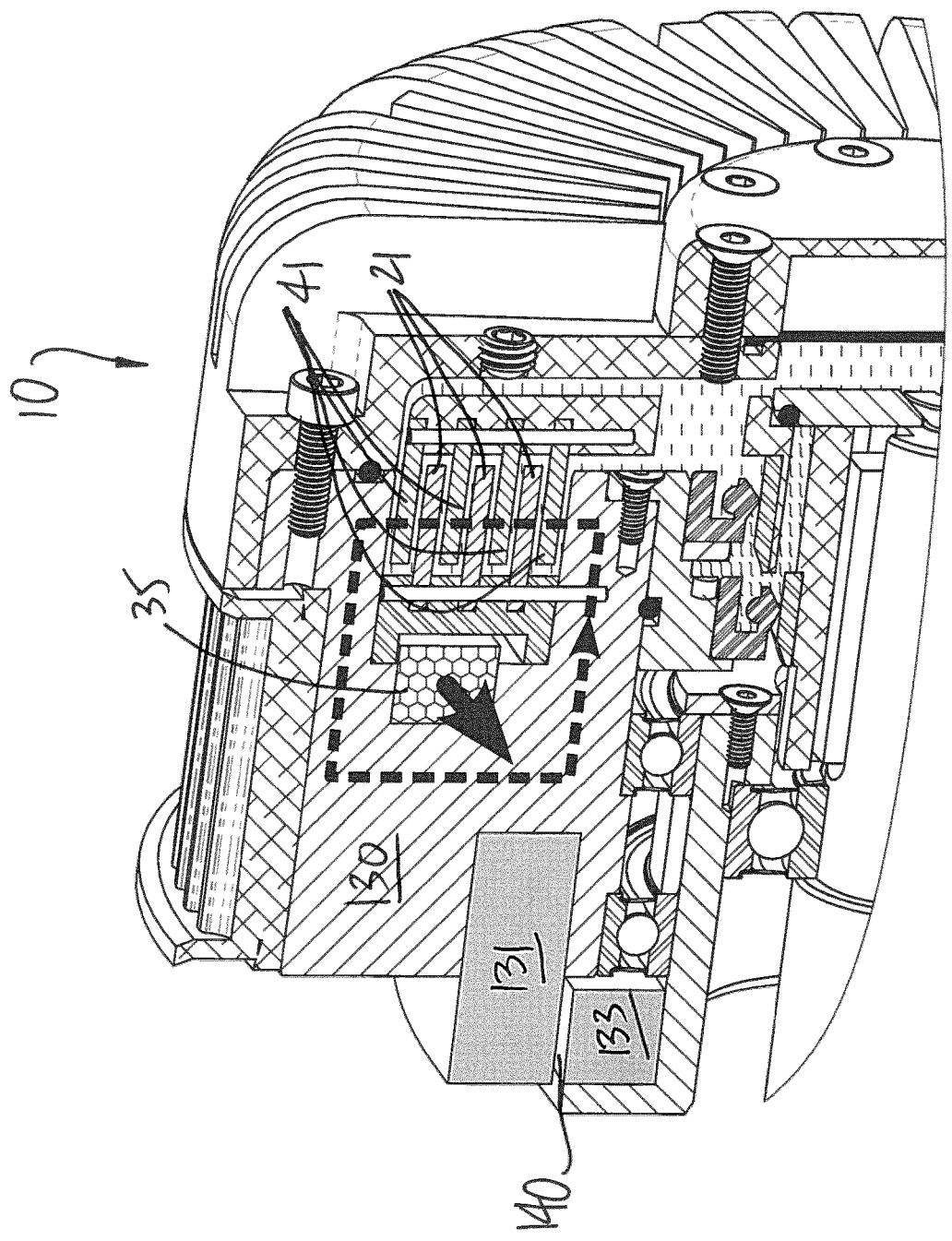
FIG. 14 is a partly sectioned view of an MR fluid clutch apparatus with a radial fluid gap for contactless power transmission, in accordance with the present disclosure.

Referring to FIG. 13, another embodiment of the MR fluid clutch apparatus 10 is illustrated, featuring contactless powering. Contactless powering may be achieved in various ways, including inductive coupling using emitting and receiving coils, only to name one possibility, others including laser, micro-wave, capacitive coupling. The MR fluid clutch apparatus 10 of FIG. 13 has several components in common with the other embodiments of the MR fluid clutch apparatus 10, whereby like reference numerals will refer to like components. The coil 35 of the MR fluid clutch apparatus 10 could be mounted on one of the rotating parts of the clutch apparatus 10, here magnetic core 130. The magnetic field F induced by the coil 35 follows a closed path which goes through the magnetic core 130, the MR fluid, the drums 21 and 41, and back to the magnetic core 130. The coil 35 may be electrically linked to a power receiver 131 that is mounted on the same rotating part, i.e., the magnetic core 130. An axial fluid gap 132 is provided between the power receiver 131 and a power emitter 133. The fluid gap or gaps 132 allows the power receiver 131 to be energized without the use of slip rings. In fact, the typical friction slip rings are replaced by contactless power slip ring or rings consisting of the power emitter 133, the fluid gap 132 and the power receiver 131, allowing the MR fluid clutch apparatus 10 to do multiple turns. In FIG. 13, the fluid gap 132 is axial, i.e., in that it is extends radially at a fixed axial position between the power receiver 131 and the power emitter 133, and separates one from the other. However, it is contemplated to provide a radial fluid gap 140, as seen in FIG. 14. The fluid gap 140 is said to be radial in that it is extends in an axial direction for a fixed radial position between the power receiver 131 and the power emitter 133, and separates one from the other. The fluid gap 132, during use, is filled with a fluid, such as air and other gases, or lubricating and/or cooling liquids like oil, grease, etc. The fluid in the gaps 132 is a non-MR fluid.

In both the embodiments of FIG. 13 and FIG. 14, the contactless power emitter 133 can also receive signal or signals from the power receiver 131 and vice-versa. The power receiver 131 is then electrically linked to the coil 35 and to sensor(s) (not illustrated). The distinction of this contactless power transmission system as in FIGS. 13 and 14 is that the magnetic core reluctance is decreased by the elimination of the reluctance of the fluid gaps. Hence, power required in order to generate the equivalent magnetic flux in the MR fluid is reduced. The size of the coil 35 can accordingly be reduced in size for a same controlled slippage. The other distinction is that the heat dissipation in the coil 35 is also reduced, hence decreasing the cooling requirement of the MR fluid clutch apparatus 10. There results an enhanced overall efficiency of the MR fluid clutch apparatus 10. Although not shown, it is contemplated to add some of the features described in the other embodiments of the MR fluid clutch apparatus 10, i.e., those of FIGS. 2-11, to the wireless embodiment of FIGS. 13 and 14. For example, the sealing configuration of FIG. 6, the fluid path components shown in FIG. 8, the translational joint shown in 9, and the permanent magnet of FIG. 10 may all be present in the wireless embodiment of FIGS. 13 and 14 of the MR fluid clutch apparatus 10.

Moreover, in some of the embodiments featuring the inner magnetic core 20A and outer magnetic core 20B, it is contemplated to connect the inner magnetic core 20A to the output rotor 40 while the outer magnetic core 20B remains connected to the input rotor 20. With reference to FIG. 4, this may readily be achieved by having the inner magnetic core 20A mounted directly to the shaft 45 by the support 51, and by putting bearings for instance between the outer magnetic core 20B and the annular body of the stator 30, while preserving the fluid gap width 34B, among various possibilities.

What is claimed is:

1. A magnetorheological fluid clutch apparatus comprising:
   a stator adapted to be connected to a structure, the stator having at least an annular wall;
   a first rotor rotatably mounted to the stator, the first rotor having at least one first shear surface;
   a second rotor rotatably mounted to the stator for rotating about a common axis with the first rotor, the second rotor having at least one second shear surface opposite the at least one first shear surface, the shear surfaces separated by at least one annular space;
   magnetorheological (MR) fluid in an MR fluid chamber including the at least one annular space, the MR fluid configured to generate a variable amount of torque transmission between the rotors when subjected to a magnetic field;
   an inner magnetic core and an outer magnetic core with an annular cavity therebetween receiving the annular wall of the stator, the inner magnetic core and the outer magnetic core connected to at least one of the rotors to rotate therewith so as to be rotatably mounted to the stator;
   outer and inner fluid gaps between the inner magnetic core and the annular wall, and between the outer magnetic core and the annular wall, the outer and inner fluid gaps filled with at least one fluid; and
   at least one coil supported by the annular wall and actuatable to deliver a magnetic field through the MR fluid, the magnetic field following a path comprising the annular wall, the outer fluid gap, the outer magnetic core, the at least one first shear surface and the at least one second shear surface, the inner magnetic core and the inner fluid gap;
   wherein one of the rotors is adapted to be coupled to a power input and the other of the rotors is adapted to be connected to an output whereby actuation of the at least one coil results in a variation of torque transmission between the rotors.

2. The magnetorheological fluid clutch apparatus according to claim 1, wherein the at least one first shear surface comprises at least one first drum, and further wherein the at least one second shear surface comprises at least one second drum.

3. The magnetorheological fluid clutch apparatus according to claim 2, comprising a plurality of the first drum, a plurality of the second drum, the first drums being intertwined with the second drums.

4. The magnetorheological fluid clutch apparatus according to claim 3, wherein the first drums are supported on one side of a first drum holder, the MR fluid chamber including a hollow chamber being on an opposite side of the first drum holder, and at least one first fluid passage being defined through the first drum holder.

5. The magnetorheological fluid clutch apparatus according to claim 4, wherein the second drums are supported by a second drum holder, the MR fluid chamber further including at least one second fluid passage being defined through the second drum holder.

6. The magnetorheological fluid clutch apparatus according to claim 5, wherein a magnetorheological fluid path is sequentially defined in the MR fluid chamber by the annular spaces, the first fluid passages, the hollow chamber, fluid passages in the outer magnetic core, a space outward of the drums, and the second fluid passages.

7. The magnetorheological fluid clutch apparatus according to claim 6, wherein the space outward of the drums is an inner cavity of a cover of the first rotor.

8. The magnetorheological fluid clutch apparatus according to claim 7, further comprising heat exchange fins on an outer surface of the cover.

9. The magnetorheological fluid clutch apparatus according to claim 7, further comprising an opening in the cover open to the MR fluid chamber, the opening being sealed closed by a flexible membrane.

10. The magnetorheological fluid clutch apparatus according to claim 9, wherein the opening opens to an expansion chamber, a resilient material being in the expansion chamber to selectively exert a biasing force on the flexible membrane.

11. The magnetorheological fluid clutch apparatus according to claim 1, wherein the inner magnetic core and an outer magnetic core are connected to the first rotor.

12. The magnetorheological fluid clutch apparatus according to claim 1, further comprising at least one permanent magnet supported by the annular wall and delivering a magnetic field through the MR fluid when no other magnetic field are present, wherein the at least one coil is actuatable to deliver a magnetic field redirecting the magnetic field of the at least one permanent magnet away from the MR fluid in order to decrease an apparent magnetic field in the MR fluid.

13. The magnetorheological fluid clutch apparatus according to claim 1, wherein one of the rotors is connected to an energy recovery device to recover energy with an output of one of the rotors.

14. The magnetorheological fluid clutch apparatus according to claim 1, further comprising a first seal connected to the stator, and in sealing engagement on an output shaft of the second rotor to bound the MR fluid chamber between the stator and the output shaft, a second seal being connected to the stator and in sealing engagement on the output shaft, such that a non-MR oil chamber is defined between the first seal, the second seal, the stator and the shaft, at least one bearing between the output shaft and the stator being located outside of the non-MR oil chamber and of the MR fluid chamber.

15. The magnetorheological fluid clutch apparatus according to claim 14, further comprising at least one permanent magnet emitting a magnetic field in the non-MR oil chamber to attract MR fluid leaking into the non-MR oil chamber.

16. The magnetorheological fluid clutch apparatus according to claim 1, further comprising one translational joint supporting the second rotor such that the second rotor is axially movable away from the first rotor to separate the shear surfaces from one another.

17. The magnetorheological fluid clutch apparatus according to claim 1, wherein the fluid gaps are radial fluid gaps.

18. A magnetorheological fluid clutch apparatus comprising:
   a stator adapted to be connected to a structure, the stator having at least an annular wall;
   a first rotor rotatably mounted to the stator, the first rotor having at least one first drum supported on one side of a first drum holder, a hollow chamber on an opposite side of the first drum holder, and at least one first fluid passage through the first drum holder;
   a second rotor rotatably mounted to the stator for rotating about a common axis with the first rotor, the second rotor having at least one second drum opposite the at least one first drum and separated by annular spaces, the at least one second drum supported by a second drum holder, at least one second fluid passage being defined through the second drum holder;

magnetorheological (MR) fluid in an MR fluid chamber including the annular spaces between the drums, the MR fluid configured to generate a variable amount of torque transmission between the rotors when subjected to a magnetic field; and an inner magnetic core and an outer magnetic core, the inner magnetic core and the outer magnetic core connected to at least one of the rotor to rotate therewith so as to be rotatably mounted to the stator; and at least one coil supported by the annular wall and actuatable to deliver a magnetic field through the MR fluid, the magnetic field following a path comprising at least the annular wall, the outer magnetic core, the at least one first drum and the at least one second drum, and the inner magnetic core;

wherein a magnetorheological fluid path is sequentially defined by the annular spaces, the first fluid passages, the hollow chamber, fluid passages in the outer magnetic core, a space outward of the drums, and the second fluid passages;

wherein one of the rotors is adapted to be coupled to a power input and the other of the rotors is adapted to be connected to an output whereby actuation of the at least one coil results in a variation of torque transmission between the rotors.

19. A magnetorheological fluid clutch apparatus comprising:

a stator adapted to be connected to a structure and having a power emitting device;

a first rotor rotatably mounted to the stator, the first rotor having a magnetic core, at least one first shear surface, and a power receiving device configured to wirelessly receive power from the power emitting device on the stator;

at least one fluid gap between the power emitting device and the power receiving device, the fluid gap entirely filled with a fluid;

a second rotor rotatably mounted to the stator for rotating about a common axis with the first rotor, the second rotor having at least one second shear surface opposite the at least one first shear surface, the shear surfaces separated by at least one annular space;

magnetorheological fluid in an MR fluid chamber including the at least one annular space between the at least one first shear surface and the at least one second shear surface, the MR fluid configured to generate a variable amount of torque transmission between the rotors when subjected to a magnetic field; and at least one coil connected to the power receiving device and supported by the magnetic core, the at least one coil actuatable to deliver a magnetic field through the MR fluid, the magnetic field following a path comprising the magnetic core, the at least one first shear surface and the at least one second shear surface;

wherein one of the rotors is adapted to be coupled to a power input and the other of the rotors is adapted to be connected to an output whereby actuation of the at least one coil results in a variation of torque transmission between the rotors.

* * * * *